United States Patent
Zheng et al.

(10) Patent No.: US 9,634,786 B2
(45) Date of Patent: Apr. 25, 2017

(54) COMMUNICATION SYSTEMS WITH PHASE-CORRELATED ORTHOGONALLY-POLARIZED LIGHT-STREAM GENERATOR

(71) Applicant: GEORGIA TECH RESEARCH CORPORATION, Atlanta, GA (US)

(72) Inventors: Jian Yu Zheng, Beijing (CN); Gee-Kung Chang, Smyrna, GA (US); Daniel Guidotti, Atlanta, GA (US); Mu Xu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/043,544

(22) Filed: Feb. 13, 2016

(65) Prior Publication Data

US 2016/0248515 A1 Aug. 25, 2016

Related U.S. Application Data

(60) Provisional application No. 62/116,069, filed on Feb. 13, 2015.

(51) Int. Cl.
*H04B 10/532* (2013.01)
*H04B 10/548* (2013.01)
(Continued)

(52) U.S. Cl.
CPC ........ *H04J 14/02* (2013.01); *H04B 10/25752* (2013.01); *H04B 10/5051* (2013.01);
(Continued)

(58) Field of Classification Search
CPC H04B 10/58; H04B 10/07955; H04B 10/516; H04B 10/564; H04B 10/588;
(Continued)

(56) References Cited

U.S. PATENT DOCUMENTS 5,602,642 A * 2/1997 Bergh ................. G01C 19/721
356/464
5,751,867 A 5/1998 Schaffner et al.
(Continued)

FOREIGN PATENT DOCUMENTS

TW 20130201408 U 8/2013

OTHER PUBLICATIONS

Adachi, S., "Physical Properties of III-V Semiconductor Compounds: InP, InAs, GaAs, GaP, InGaAs, and InGaAsP," Jan. 2005, John Wiley & Sons, Inc., Chapter 8, p. 135.
(Continued)

*Primary Examiner* — Leslie Pascal
(74) *Attorney, Agent, or Firm* — Troutman Sanders LLP; Ryan A. Schneider; Christopher W. Glass

(57) ABSTRACT

In one aspect, the present disclosure relates to a communications system which, in one embodiment, includes a phase-correlated, orthogonally-polarized, light-stream generator (POLG) for preparing light into phase coherent light streams having defined states of polarization and spectral composition. In one embodiment, the POLG includes a light source configured to emit light having a predetermined wavelength and a polarization apparatus configured to prepare light from the light source into particular states of polarization. The POLG also includes a phase modulator configured to produce light having a plurality of wavelengths and configured to retard the phase of propagation of light with a first state of linear polarization while not retarding the phase of light with a state of linear polarization orthogonal to the first state of linear polarization when an external electric field is applied. The POLG also includes an electrical oscillator configured to periodically apply an electric field to the phase modulator.

23 Claims, 11 Drawing Sheets

(51) Int. Cl.
  *H04J 14/06* (2006.01)
  *H04B 10/516* (2013.01)
  *H04B 10/2575* (2013.01)
  *H04J 14/02* (2006.01)
  *H04B 10/50* (2013.01)

(52) U.S. Cl.
  CPC ......... *H04B 10/516* (2013.01); *H04B 10/532* (2013.01); *H04B 10/548* (2013.01); *H04J 14/06* (2013.01)

(58) Field of Classification Search
  CPC ............... H04B 10/548; H04B 10/532; H04B 10/25752; H04J 14/02; H04J 14/06
  USPC .......................................... 398/182–184, 201
  See application file for complete search history.

(56) References Cited

U.S. PATENT DOCUMENTS

| | | |
|---|---|---|
| 7,715,730 B2 | 5/2010 | Hecker et al. |
| 8,050,351 B2 | 11/2011 | Cho et al. |
| 8,116,635 B2 | 2/2012 | Tanimura et al. |
| 8,737,844 B2 | 5/2014 | Zeng et al. |
| 8,923,660 B2 | 12/2014 | Dorin et al. |
| 2014/0193152 A1 | 7/2014 | Zhou et al. |
| 2014/0270803 A1 | 9/2014 | Olsson |

OTHER PUBLICATIONS

Campillo, A., "Orthogonally Polarized Single Sideband Modulator," Optics Letters, vol. 32, No. 21, Nov. 2007, pp. 3152-3154.
Chang, Kai, "Handbook of Optical Components and Engineering," John Wiley & Sons, Inc., 2003, pp. 1011-1016.
Dong, Z. et al., "Ultra-dense WDM-PON delivering carrier-centralized Nyquist-WDM uplink with digital coherent detection," Optics Express, vol. 19, No. 12, May 2011, pp. 11100-11105.
Dris, S. et al., "Low-complexity DSP using undersampling for heterodyne receivers in coherent passive optical access networks," 38th European Conference and Exhibition on Optical Communications (ECOC), 2012, pp. 1-3.
Faist, J., Optical Properties of Semiconductors, Eidgen Ossische Technische Hochschule 2008. [Pending Article].
Ip, E. et al., "Coherent detection in optical fiber systems," Optics Express, 2008, vol. 16, No. 2, pp. 753-791.
Kazovsky, L.G. et al., "Broadband Optical Access Networks," Wiley, 2011, p. 66.
Kuschnerov, M. et al., "DSP for Coherent Single-Carrier Receivers," IEEE, Journal of Lightwave Technology, vol. 27, No. 16, 2009, pp. 3614-3622.
Lavery, D. et al., "A long-reach ultra-dense 10 Gbit/s WDM-PON using a digital coherent receiver," Opt Express, 2010, pp. 25855-25860, 18(25).
Lavery, D. et al., "Digital Coherent Receivers for Long-Reach Optical Access Networks," Journal of Lightwave Technology, vol. 31, No. 4, 2013, pp. 609-620.
Li, G., "Recent advances in coherent optical communication," Advances in Optics and Photonics, vol. 1, No. 2, 2009, pp. 279-307.
Nakazawa, M. et al., High Spectral Density Optical Communications Technologies, Springer, 2010.
Ogiso, Y. et al., "Planar n-SI-n. heterostructure athermal InP (110) optical modulator," Optics Express, vol. 22, No. 21, 2014, pp. 25776-25781.
Prat, J. et al., Simple intradyne PSK system for udWDM-PON, Optics Express, vol. 20, No. 27, 2012, pp. 28758-28763.
Presi, M. et al., "All DFB-Based Coherent UDWDM PON with 6.25 GHz Spacing and a 40 dB Power Budget," IEEE Photonics Technology Letters, vol. 26, No. 2, 2014, pp. 106-110.
Roberts, K. et al., "Performance of Dual-Polarization QPSK for Optical Transport Systems," Journal of Lightwave Technology, vol. 27, No. 16, 2009, pp. 3546-3559.
Rohde, H. et al., "Coherent Optical Access Networks," Optical Fiber Communication Conference and Exposition (OFC/NFOEC), Los Angeles, 2011, 3 pages.
Sagues, M. et al., "Orthogonally polarized optical single sideband modulation for microwave photonics processing using stimulated Brillouin scattering," Optics Express, vol. 18, No. 22, 2010, pp. 22906-22914.
Savory, S.J., "Digital Coherent Optical Receivers: Algorithms and Subsystems," IEEE Journal of Selected Topics Quantum Electronics, vol. 16, No. 5, 2010, pp. 1164-1178.
Shahpari, A. et al., "Spectrally Efficient Enhanced-Performance Bidirectional Coherent PON with Laserless 10 Gb/s ONU [Invited]," IEEE Journal of Optics Communications Network, vol. 7, No. 3, 2015, pp. A403-A413.
Wooten, E.L., IEEE Journal of Selected Topics in Quantum Electronics, 6, 69-82 (2000).
Zheng, J. et al., "Orthogonal Single-Sideband Signal Generation Using Improved Sagnac-Loop-Based Modulator," IEEE Photonics Technology Letters, vol. 26, No. 22, 2014, pp. 2229-2231.
Zhu, M. et al., "Efficient Delivery of Integrated Wired and Wireless Services in UDWDM-RoF-PON Coherent Access Network," IEEE Photonics Technology Letters, vol. 24, No. 13, 2012, pp. 1127-1129.

\* cited by examiner

COMMUNICATION SYSTEMS WITH PHASE-CORRELATED ORTHOGONALLY-POLARIZED LIGHT-STREAM GENERATOR

CROSS-REFERENCE TO RELATED APPLICATION

This Application claims priority to and benefit under 35 U.S.C §119(e) of U.S. Provisional Patent Application Ser. No. 62/116,069 filed Feb. 13, 2015, which is hereby incorporated by reference herein in its entirety as if fully set forth below.

Some references, which may include patents, patent applications, and various publications, are cited in a reference list and discussed in the disclosure provided herein. The citation and/or discussion of such references is provided merely to clarify the description of the present disclosure and is not an admission that any such reference is "prior art" to any aspects of the present disclosure described herein. All references cited and discussed in this specification are incorporated herein by reference in their entireties and to the same extent as if each reference was individually incorporated by reference.

BACKGROUND

As optical fiber and optical-wireless communication network advance to accommodate fifth generation wireless networks, dual-polarization coherent optical communication schemes are being widely envisioned for use in trunk networks and deep wavelength division multiplexing (DWDM) networks to increase spectral and power efficiency ([Roberts 2009]). Greater control over phase coherence is advantageous in wireless networks that carry radio frequency services from a central office to a radio transmitter antenna by utilizing a local optical fiber network within a macro cell. By harnessing dual polarization as an orthogonal modulation scheme, all degrees of freedom of the light wave, i.e, amplitude, phase, and polarization, can be utilized simultaneously for the conveyance of data ([Li 2009], [Nakazawa 2010]).

Phase coded information cannot be detected directly by a photodetector. A CW light source having a narrow optical spectrum is required to act as an optical local oscillator such that when mixed with the data bearing optical signal on balanced photo-detectors, the amplitude and phase of the coded signal is retrieved by virtue of the linear response of the photo-detector to the incident fields and by using digital processing techniques. The phase coded information is down-converted from the optical domain to the electrical domain by virtue of the interference beating of electric fields from both the signal light and an optical local oscillator light on the photo-detector. This process is commonly referred to as "heterodyne coherent detection" ([Ip 2008]). In order to obtain reliable data down-conversion from a complex carrier wave exhibiting high order modulation, random phase fluctuations, and random polarization fluctuations in both the local oscillator and signal lights, the phase of the local oscillator light must be controlled to a high degree; better yet if the phase of the signal light were correlated to the phase of the optical local oscillator and the optical spectrum of each were to be very narrow. In general this is difficult to achieve with un-correlated or free-running optical local oscillators and signal light sources, particularly after several kilometers of optical fiber. Consequently, various ways to digitally retrieve phase information are conventionally employed. The complexity of digital data processing can be simplified if the phase of the local oscillator light were to be derived from the same light source as the signal light.

Disadvantages of some prior art approaches, including complexity and cost of optical coherent receiver equipment, will now be described. The problem of phase noise is, in part, remedied by the use of optical local oscillator sources having a narrow optical spectrum, used to down-convert baseband data from the optical domain to the electrical domain. This is followed by complex digital signal processing integrated circuits and algorithms to equalize received signals, maintain phase coherence, and partially compensate for random fluctuations. Digital data processing technology in coherent optical signal detection is described by Savory and Kuschnerov ([Savory 2010], [Kuschnerov 2009]). As shown in FIG. 1 (prior art), in the case of dual polarization coherent detection, there are four receiver channels for each polarization channel or one phase and one quadrature channel for each of two orthogonal polarizations. Therefore, two high speed, analog-to-digital converters are needed for each polarization channel, one after each analog coherent receiver, to convert the analog received signal to the digital domain. The analog-to-digital converters must then be interfaced to a digital signal processor unit which performs correction algorithms such as chromatic dispersion compensation, polarization control and equalization, carrier phase recovery, and forward error correction decoding.

To meet the demand of growing data traffic, coherent detection was introduced in Ultra-Dense Wavelength-Division Multiplexing Passive Optical Networks (UDWDM-PON), as it promotes high transmission capacity with enhanced spectral efficiency. ([Dong 2011], [Zhu 2012]). However, considering the cost, latency, and power consumption attributed to spectrally narrow optical local oscillators and digital signal processing (DSP) decoders, it may be difficult to deploy DSP-based detection in a passive optical network (PON), since in a PON architecture, the optical network units (ONUs), that convert the received optical signal to electrical signal, are located at the subscriber's premises, a location that is not under the control of the service provider. ONU environmental conditions vary and adjustments and maintenance cannot be shared with the subscriber. Thus, ONUs have to be simple, reliable and not require tuning or maintenance. Two potentially cost effective ways to render ONUs suitable for the UDWDM-PON network are: 1) replace the narrow-linewidth optical local oscillator (LO) in the ONU with a cost-effective alternative; and 2) reduce the hardware implementation complexity of the DSP unit. ([Presi 2014] and [Prat 2012]).

In prior art coherent heterodyne detection, a weak information bearing optical signal and a substantially stronger continuous wave local optical oscillator light of somewhat different but spectrally narrow optical wavelength may be mixed on a photodetector to retrieve data using received power at sum and difference frequencies, enhanced in magnitude by the stronger amplitude of the optical local oscillator. To reduce ONU cost further, a single polarization, self homodyne, optical communication link that does not use an optical local oscillator and convert data to the electrical domain by direct conversion on a photodetector has been reported. ([Shahpari 2014]). However, an external cavity laser is used at the transmitter along with additional optical filtering at the receiver. DSP and complex signal processing algorithms, for example, analog-to-digital converters (ADCs), forward error correction, static equalizer, phase recovery estimation, and dynamic equalizer, are still necessary for phase and polarization estimation. Cost reduction has consequences: slower ADCs can be used at the expense of under-sampling of the received signal, use of serial-to-parallel converters and increased filter complexity in the DSP unit. Unfortunately, only low order modulation formats with a single polarization mode have been demonstrated by using these methods.

FIG. 1 shows a prior art system 100 generally comprising a coherent optical detection scheme operating in dual polarization mode with in-phase and quadrature coding. A polarized light stream carries encoded data (see "DATA"). Orthogonal polarization components are separated by polarizer 105. A spectrally narrow external cavity laser 115 provides a local optical oscillator reference. An optical light splitter 120 divides the reference light into two paths to be combined with each of the two orthogonal polarizations by 90° optical hybrids 125. The composite light streams containing data and reference light streams are incident on pairs of balanced photo-diode detectors 130 where electric fields of each light stream are mixed by the non-linear response of the photo-diode detectors that generate a corresponding electrical waveform response representative of the in-phase and quadrature data carried by each state of polarization. The electrical response of each photo-diode detector pair is amplified by amplifiers 135 and digitally analyzed and processed by digital signal processing apparatus 110, which may perform signal correction and data recovery functions, examples of which can be: analog-to-digital conversion, channel equalization, polarization de-multiplexing, polarization mode dispersion compensation, clock recovery, phase recovery and estimation and quadrature phase shift key decoding. Much of the DSP equipment is used to compensate for channel impediments of which polarization mode dispersion, chromatic dispersion, and phase de-coherence are primary manifestations. It is desirable to reduce the magnitude of channel impediments so as to reduce the amount of DSP resources necessary to retrieve base band data.

Disadvantages of prior art means for generation of orthogonally polarized lights and information encoding thereof will now be described. Modulation formats are a key part of communication in that they enable spectrally efficient wireless and wired communication. When communicating over optical fibers, optical single sideband phase modulation has been shown to reduce unwanted chromatic dispersive effects on the light carrier wave. Optical fiber can provide long distance transportation of wireless information. Radio frequency information can be converted to the optical domain on optical sidebands of an optical carrier wavelength and transported over optical fibers and subsequently converted back to the electrical domain to propagate wirelessly. The preservation of data, specifically phase information, upon transition from optical fiber to free space electromagnetic wave propagation, requires that a coherent phase relation be maintained between the carrier frequency and the single sideband frequency. Relative phase or wavelength variations, for example spectral broadening in the optical domain, directly translate into radio frequency noise, signal fading of free-space radio waves, and loss of data integrity.

When a robust coherent phase relation exists between an optical carrier frequency having electric field oriented in a first direction and derived single or double sideband frequency or frequencies having electric field oriented in an orthogonal direction, the process of coherent heterodyne detection can be simplified without referring to an external optical local oscillator. To maintain strong phase coherence, the carrier frequency and sideband frequencies can originate from the same narrow laser source and both traverse the same optical path through various optical components, and electro-optic modulators in particular.

Further, the carrier frequency and optical sideband(s), in addition to being spectrally separated, can be orthogonally polarized relative to one another, as they propagate along the same optical channel. In this way, an isotropic channel will substantially present the same impediment mechanisms to both carrier and signal sidebands. In contrast, a crystal modulator generally presents anisotropic optical properties that depend on the polarization direction of light and direction of propagation with respect to a crystal axis of symmetry. For example, light that is polarized along a first crystal direction will be maximally modulated by a $LiNbO_3$ electro-optic modulator while light that is polarized in an orthogonal direction will be substantially less modulated due to the intrinsic birefringence of the $LiNbO_3$ crystal. Other electro-optic crystals such as GaAs or InP are not intrinsically birefringent and can lead to the case in which light is modulated in a first state of polarization while un-modulated in the orthogonal state of polarization. This particular property of naturally non-birefringent or isotropic crystal electro-optic modulators can be important in preventing modulation leakage between two orthogonally polarized channels.

Various prior art methods have been demonstrated that are capable of producing co-linear light streams that differ in wavelength and are orthogonally polarized relative to one another. However, these methods produce lights that are not strongly correlated in phase and therefore suffer from random noise, signal fading of free-space radio waves, and loss of data integrity. One method to produce lights having different wavelengths and orthogonal states of polarization is described by Sagues, et al. ([Sagues 2010]), which makes use of stimulated Brillouin scattering in an optically pumped optical fiber. Two parallel polarized light waves differing in wavelength are phase coherent and have spectral separation greater than the Brillouin linewidth. The Brillouin linewidth in silica glass is typically 130-210 MHz at a pump wavelength of 4880 Å. The optical fiber has low chromatic dispersion. A counter propagating pump light is polarized perpendicular to the polarization direction of two parallel polarized lights. One of the wavelength pair is chosen to fall within the Brillouin linewidth and its linear polarization gradually rotates toward the polarization direction of the pump light, while the second wavelength of the pair is chosen to lie outside the Brillouin bandwidth and its polarization remains unchanged. The technique uses an optical circulator connecting the pump light, the two parallel polarized incident wavelengths and the two orthogonally polarized exiting wavelengths, neither of which is modulated to convey information. If any one of the exiting lights were to be encoded with data, it would have to be diverted to a modulator and consequently follow a different path. In that case, its phase correlation with respect to its twin, un-modulated light, can no longer be assured.

Another prior art method that results in light streams having different wavelengths and mutually orthogonal polarizations is described by Campillo. ([Campillo 2007]). The method uses a polarization modulation crystal waveguide by means of which an initial light stream having a first wavelength and a first polarization is converted to two exiting light streams: one comprising a portion of the incident light with initial polarization, and an orthogonally polarized sideband having a second wavelength. The sideband carries no information. The introduction of an output polarizer can provide intensity on-off modulation that can be configured to convey information.

Another prior art method of producing lights having different wavelengths, at least two of which are orthogonally polarized relative to one another, is described by Zheng, et al. ([Zheng November 2014]). This technique uses a Sagnac loop interferometer, a double drive Mach-Zehnder modulator and a polarization maintaining Bragg grating optical fiber to convert an incident light stream having a first wavelength and a first polarization to an exiting light stream having the same spectral content and polarization as the incident light but having reduced intensity. An orthogonally polarized sideband is produced in the process, comprising a second wavelength. If any one of the exit light waves were to be encoded with data, it would have to be separated and consequently follow a different path. In that case its phase correlation to the un-modulated wavelength can no longer be assured.

Disadvantages of prior art approaches with $LiNbO_3$ birefringent modulators will now be described. To date, the most common electro-optic modulator in use in telecommunication is the lithium niobate ($LiNbO_3$), abbreviated as LN, modulator. The $LiNbO_3$ crystal displays trigonal crystal symmetry (space group symmetry R3c) and is intrinsically birefringent with index of refraction having the uniaxial form: $n_o = n_x = n_y = 2.297$ and $n_e = n_z = 2.208$. Its linear electro-optic tensor coefficients are: $r_{13} = 8.6 \times 10^{-12}$ m/V, $r_{22} = 3.4 \times 10^{-12}$ m/V, $r_{33} = 30.8 \times 10^{-12}$ M/V and $r_{51} = 28.0 \times 10^{-12}$ m/V. Since $r_{33}$, along the extraordinary axis of LN, is the largest electro-optic coefficient, an electric field, $F_j$ (j=x, y, z), applied parallel to the extraordinary axis (z-direction of the index ellipsoid) will result in the most efficient modulation. Therefore, under the external electric field: $F_z \neq 0$ and $F_x = F_y = 0$, the index ellipsoid for $LiNbO_3$ can be represented by:

$$x^2\left(\frac{1}{n_o^2} + r_{13}F_z\right) + y^2\left(\frac{1}{n_o^2} + r_{13}F_z\right) + z^2\left(\frac{1}{n_o^2} + r_{33}F_z\right) = 1 \quad \text{Eq. 1}$$

The z-direction is that of the extra-ordinary crystal axis in uniaxial LN.

In the case of an x-cut LN crystal, an external electric field $F_z$ applied along the z-direction lies in the plane of the crystal surface. Prior art electrode configurations are illustrated FIG. 2, which depicts a cross section drawing of an x-cut $LiNbO_3$ electro-optic modulator 200(a) and an electrode configuration in the case of a z-cut $LiNbO_3$ crystal electro-optic modulator 200 (b). Features 220 and 215 represent ground (G) and signal (S) electrical contacts separated from the crystal by buffer layer 225. Electric field lines $F_z$ are represented by features 230 and are oriented predominantly along the z-direction at the waveguide core 235, or the direction of the extraordinary axis of the crystal. TE and TM waveguide modes are both supported by the dielectric rectangular waveguides in LN. ([Wooten 2000]).

In the case of x-cut LN crystal 200(a), the optical waveguide is oriented along the y-axis (because the x-axis is vertical to the LN wafer surface and the z-axis is the direction of the applied electric field). Therefore, for light polarized with electric field along the x-axis or z-axis, the optical refractive indices are given by:

$$n_x \approx n_y = n_o - \tfrac{1}{2}n_o^3 r_{13} F_z \quad \text{Eq. 2}$$

$$n_z \approx n_e - \tfrac{1}{2}n_e^3 r_{33} F_z \quad \text{Eq. 3}$$

Therefore, under an external modulation electrical field applied in the z-direction, the $LiNbO_3$ crystal remains uniaxial and the optical axis remains unchanged, but the index ellipsoid is deformed by the modulation field, $F_z$, in accordance to Eqs. 1 and 2. Light propagating along the z-direction will experience the same phase change, independent of polarization. However, light propagating along the x- or y-direction will experience a phase change on its state of polarization. In the case of an x-cut $LiNbO_3$ crystal, both electrodes are placed symmetrically on both sides of the waveguide such that the bias field is along the z-direction. In this case, if light is propagating along a waveguide aligned with the y-direction and is polarized along the z- (or x-) direction, then the electric field components will be modulated in accordance with Eq. 4 (or Eq. 5), where $E_{TE}$, $E_{TM}$, and $E_o$ refer to the electric field amplitude of the light.

$$E_{TE} = \hat{z} E_o e^{-ik_0(n_e - 1/2 n_e^3 r_{33} F_z) y} \quad \text{Eq. 4}$$

$$E_{TM} = \hat{x} E_o e^{-ik_0(n_e - 1/2 n_e^3 r_{13} F_z) y} \quad \text{Eq. 5}$$

Equations 4 and 5 show that for the x-cut $LiNbO_3$ crystal modulator, the TE optical mode (polarized along the z-axis) is more efficiently modulated than the TM optical mode (polarized along the x-axis) because $r_{33}$ is greater than $r_{13}$ ($r_{33}/r_{13} = 3.58$), resulting in a TE/TM power extinction ratio of about 20 dB, clearly contaminating the orthogonally polarized channel.

In the case of a z-cut $LiNbO_3$ crystal modulator 200(b), an electric field applied along the z-direction means that the electric field is vertical. In this case, the waveguide can be defined along either the x- or y-direction. For example, for an optical waveguide fabricated along the y-axis, the intersection ellipse is again represented by Eq. 1, and the optical indices of refraction are the same as those in Eq. 2 and Eq. 3. However, for a z-cut crystal, the TM optical mode is polarized along the z-axis, and the TE optical mode is polarized along the x-axis. Consequently, for the z-cut $LiNbO_3$ modulator, the TM mode is more efficiently modulated than the TE mode, by the same power ratio of about 20 dB, clearly contaminating the orthogonally polarized channel.

Conventional approaches exist for light streams containing plural wavelengths, at least two of which display electric fields that oscillate along orthogonal directions, are co-linear and correlated in phase. However, there does not exist any teaching on how to maintain phase coherence and orthogonal polarization while at the same time encode information on at least one wavelength channel in the light stream, or how to encode different information on two orthogonal polarization channels having the same wavelength as is necessary for in phase and quadrature coding.

It is with respect to these and other considerations that the various embodiments described below are presented.

SUMMARY

Some aspects of the present disclosure relate to apparatus generating phase-correlated orthogonally polarized lights, method of construction, and fiber wireless communication systems based thereon.

Some aspects of the present disclosure relate to a phase-correlated, orthogonally-polarized, light-stream generator (POLG) apparatus and method of construction and use. In some embodiments, by means of the POLG, the state of a stream of light may be constructed from a single light source. The stream of light may contain a plurality of wavelength channels, at least two of which can be linearly polarized orthogonal to one another. At least one optical channel can be modulated without disturbing orthogonally polarized channels. All optical channels can be substantially co-linear and carried in optical fibers. All wavelength channels can maintain coherent phase relation with respect to one another and two orthogonally polarized, phase-coherent channels can be individually coded and configured to communicate in phase and quadrature code by means of radio frequency without using radio frequency mixers.

Some aspects of the present disclosure relate to the preparation of light streams that are orthogonally polarized, contain multiple wavelengths, and whose phases of propagation are correlated to one another. Some aspects further relate to encoding data on one light stream without perceptibly disturbing orthogonally polarized light streams.

Some aspects of the present disclosure relate to the generation of coded radio frequency waves from spectrally different and phase correlated light streams, at least one of which carries coded information. Some aspects of the present disclosure relate to the generation of phase correlated, radio frequency local oscillator signals, derived from phase correlated light streams. In some embodiments, radio frequency local oscillators can be used to demodulate received radio frequency transmissions.

Some aspects of the present disclosure relate to analog in-phase and quadrature modulation of radio frequency waves. In some embodiments, phase and quadrature data can be derived from phase correlated light streams and are encoded on orthogonally polarized lights. Some aspects of the present disclosure relate to a co-propagating central carrier using phase correlated local oscillator in digital signal processing front end in coherent optical signal detection.

In accordance with some aspects of the present disclosure, in one or more embodiments, a communication system can include a first section for preparing the state of polarization of a POLG, and a second section. The first section may incorporate a semiconductor light source, a linear polarizer, a 90° optical retardation plate, and a second linear polarizer that can be rotated. Additionally, the first section may include an electrically-driven phase modulator that periodically retards the phase of propagation of a light stream having a first polarization while not perceptibly affecting light having orthogonal polarization. In the second section, data may be encoded on a light stream having a first linear polarization while a light stream having orthogonal polarization may not be perceptibly affected.

In accordance with some aspects of the present disclosure, in one or more embodiments, semiconductor crystals exhibiting the zinc blende structure with space group symmetry F$\overline{4}$3m are used in communication systems. Gallium arsenide and indium phosphide are two representative semiconductors exhibiting this space group. Optical waveguides composed of these semiconductors can be oriented along [110] or [$\overline{1}$10] crystallographic direction in a (001) plane and may be activated by electric fields substantially oriented in the [001] direction while light propagates in the optical waveguides configured as an optical interferometer. The interactions between the applied external electric field in the [001] direction, the symmetry of the F$\overline{4}$3m electro-optic tensor and the orientation of the waveguides parallel to [110] or [$\overline{1}$10] direction in the (001) plane may be such that only light that is polarized with electric field vector in the (001) plane is modulated by the applied field, while light that is polarized with electric filed vector parallel to the [001] direction is not perceptibly modulated.

In accordance with some aspects of the present disclosure, one or more embodiments may comprise a radio frequency transmitter and a radio frequency receiver, both having functionalities enabled by the state of polarization, phase coherence, spectral content of the light streams prepared by a POLG, and the polarization-specific selectivity of semiconductor modulator crystals exhibiting F$\overline{4}$3m symmetry. A first light stream comprising a data-bearing sideband and a second, un-modulated central frequency can be prepared in a first state of polarization in conjunction with the POLG. The first light stream can generate data coded radio frequency waves by heterodyne mixing of the optical fields on a semiconductor photo-diode. The coded radio frequency waves can be launched into free space by a radio frequency antenna radiator. The second light stream, simultaneously prepared by the POLG, can be polarized orthogonal to the first light stream, and has a central carrier frequency and at least one non-modulated sideband frequency. The second light stream generates a local oscillator, radio frequency signal by heterodyne mixing of the optical fields on a second semiconductor photo-diode. The local oscillator signal can be used in conjunction with a phase tracking feed-back loop and a radio frequency mixer to retrieve data received by radio frequency transmission.

In in-phase and quadrature communication, both phase and quadrature amplitude may be parceled into finer increments in a symbol cycle, sequence the phase and amplitude increments upon transmission and retrieve the same sequences upon reception. This practice is commonly referred to as high order format coding and makes use of analog in-phase and quadrature modulation, either of light streams in wired communication or of radio frequency waves in wireless communication.

In accordance with another aspect, in some embodiments of the present disclosure, phase and quadrature relations can be derived from the POLG in conjunction with subsequent modulation with electro-optic modulators exhibiting F$\overline{4}$3m space group symmetry and re-arrangements of the state of polarization of light stream. Such embodiments can make use of a polarization-maintaining optical coupler, a 90° symbol optical delay, first and second electro-optic modulators comprising crystals exhibiting F$\overline{4}$3m space group symmetry, and a polarization combiner that re-constitutes the in-phase and quadrature of received coded light streams. A reconstituted received light stream may be used, in conjunction with heterodyne mixing on a suitable photo-diode and a radio frequency antenna radiator, to transmit high format modulated data on radio frequency carrier waves.

In accordance with some aspects of the present disclosure, one or more embodiments can comprise co-propagating central carrier wavelength and sideband data in each of two orthogonal light streams, where one carries in-phase data while the other carries quadrature data. The two orthogonally polarized light streams can be sent, each to heterodyne mix central frequency with data sideband and amplified before entering the digital signal processing stage. The detection process is simplified by the phase coherent, co-propagating reference wave.

In accordance with some aspects of the present disclosure, one or more embodiments can utilize an electro-optic modulator comprising optical waveguides with zinc blende crystal symmetry by means of which traversing light of one polarization can be substantially modulated while light of the orthogonal polarization is substantially not effected and is used as the phase correlated, local optical oscillator in optical coherent detection simplifying digital signal processing at the receiver, thereby simplifying digital signal processing equipment and minimizing latency time.

In accordance with some aspects of the present disclosure, in one or more embodiments, a POLG apparatus can comprise RF Encryption. When used in conjunction with polarization selective modulators, the POLG apparatus can use optical methods to transmit analog radio frequency data in a format generally referred to as "frequency hopping spread spectrum" relating to the transmitting and receiving of secure data in wireless radio frequency communications.

Other aspects and features according to the present disclosure will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

DETAILED DESCRIPTION

Figure 1:
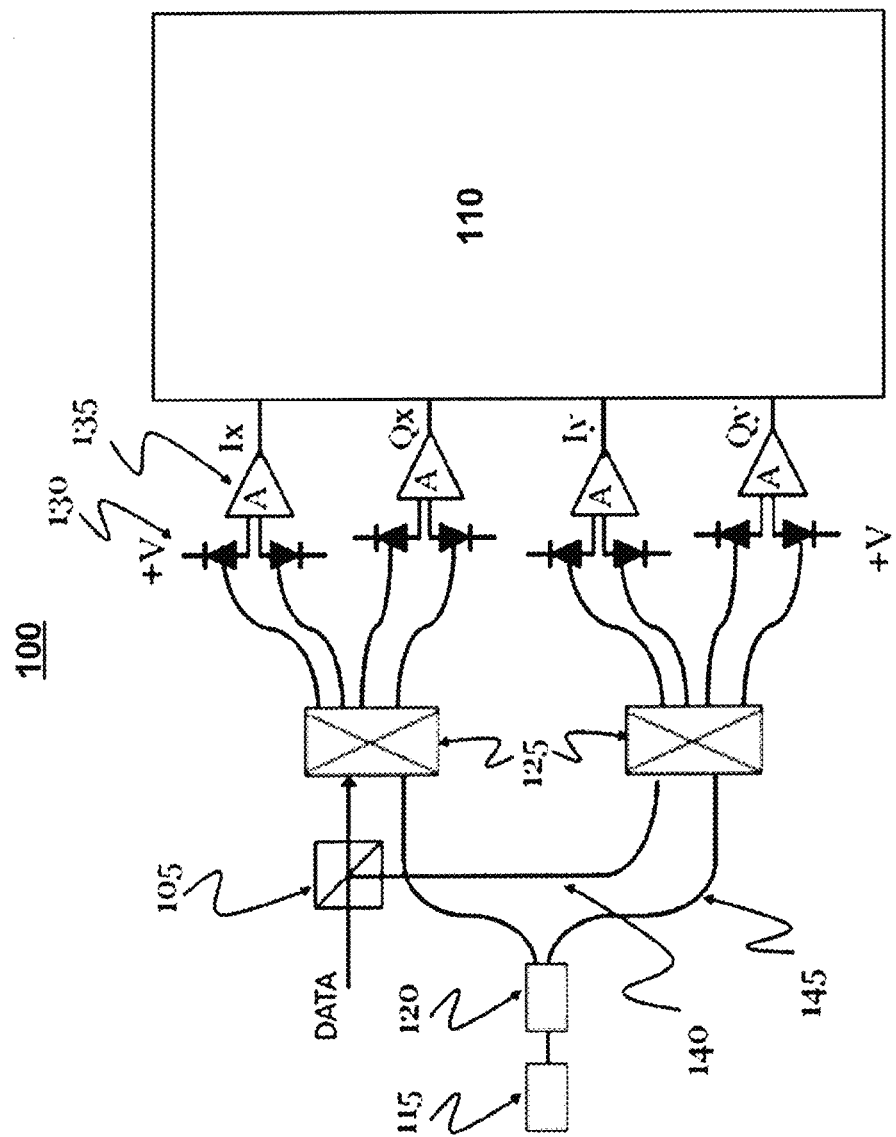
FIG. 1 illustrates a prior art system with a coherent optical detection scheme operating in dual polarization mode with in-phase and quadrature coding.
Figure 2:
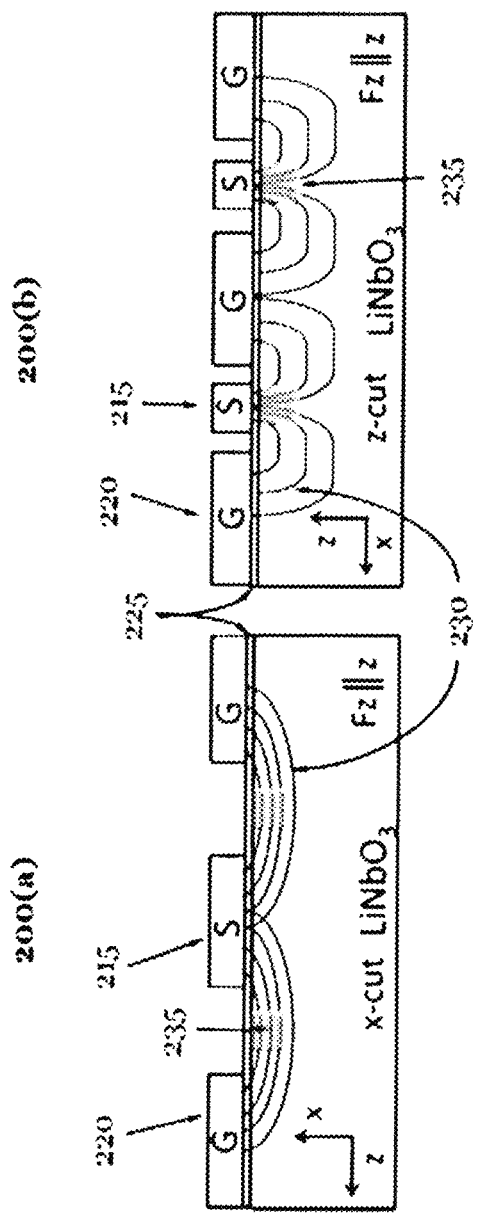
FIG. 2 is a cross sectional view of prior art x-cut and z-cut lithium niobate crystal modulators with sketched external drive field directions, electrical contact placement, and optical waveguide orientation.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

In one embodiment of the present disclosure, a phase-correlated orthogonally-polarized light-stream generator (POLG) apparatus is configured to prepare light streams displaying plural phase-correlated wavelengths that are either parallel or orthogonally polarized with respect to one another.

In one embodiment of the present disclosure, an electro-optic modulator having optical waveguides with zinc blende crystal symmetry is configured to substantially modulate a traversing light of one polarization while not affecting a light of an orthogonal polarization. In one embodiment, the electro-optic modulator can be used as a phase-correlated, local optical oscillator in optical coherent detection simplifying digital signal processing at the receiver, thereby simplifying digital signal processing equipment and minimizing latency time.

In one embodiment, a light stream having orthogonally polarized lights traverses a zinc blende electro-optic modulator wherein a first polarized light can be encoded with data while a second orthogonally polarized light can be un-modulated. In one embodiment, a first data bearing light stream is converted to radio frequency data transmission while a second, orthogonally polarized, light stream generates a radio frequency local oscillator signal used in conjunction is radio frequency mixer and phase tracking feedback loop for decoding incoming radio frequency signal having the same carrier frequency, thus simplifying the radio frequency receiving apparatus.

One embodiment can use optical phase-sensitive, high format modulation, e.g., an in-phase and quadrature phase shift key modulation, and the conversion of the formatted light stream to in-phase and quadrature radio frequency electrical signals that can be radiated as an in-phase and quadrature carrier wave without the need for radio frequency mixers or frequency synthesized electrical local oscillator.

One embodiment can use detection of high format modulated optical signals having orthogonal, linearly polarized and phase-coherent light streams, where a first stream carries in-phase data and a second stream carries quadrature data, and is processed by digital processing hardware and algorithms. The processing by digital processing hardware can be simplified and comprise increased coherency by virtue of the phase-coherent state and orthogonal polarization of the constituent light streams.

In one embodiment, a POLG apparatus can comprise RF Encryption. When used in conjunction with polarization selective modulators, the POLG apparatus can use optical methods to transmit analog radio frequency data in a format generally referred to as "frequency hopping spread spectrum" relating to the transmitting and receiving of secure data in wireless radio frequency communications.

In one embodiment, a coherent communication system can comprise two apparatus: a POLG configured to prepare a stream of light in a state having plural wavelengths, at least two of which are linearly polarized orthogonal to one another; and an electro-optic light flux modulator having one or more optical waveguides belonging to a crystalline material displaying zinc blende or $F\bar{4}3m$ space group symmetry and configured to modulate only one of two orthogonal states of linear polarization of light while imperceptibly affecting the orthogonal state of polarization.

Some embodiments of the present disclosure can comprise a POLG sub-assembly and a highly polarization selective electro-optic light modulator. One embodiment can comprise both a transmitter and a receiver of radio frequency signal. Another embodiment can comprise a phase and quadrature modulation means for coding both optical and radio frequency transmissions. Another embodiment can comprise simplified in phase and quadrature optical coherent detection without use of an external optical oscillator.

In one embodiment, transmission of optical radio frequency information and receiving and processing of information carried by electromagnetic, radio frequency waves can be simplified. Both radio frequency transmission and reception can be enabled by the POLG and polarization specific modulators.

Figure 3:
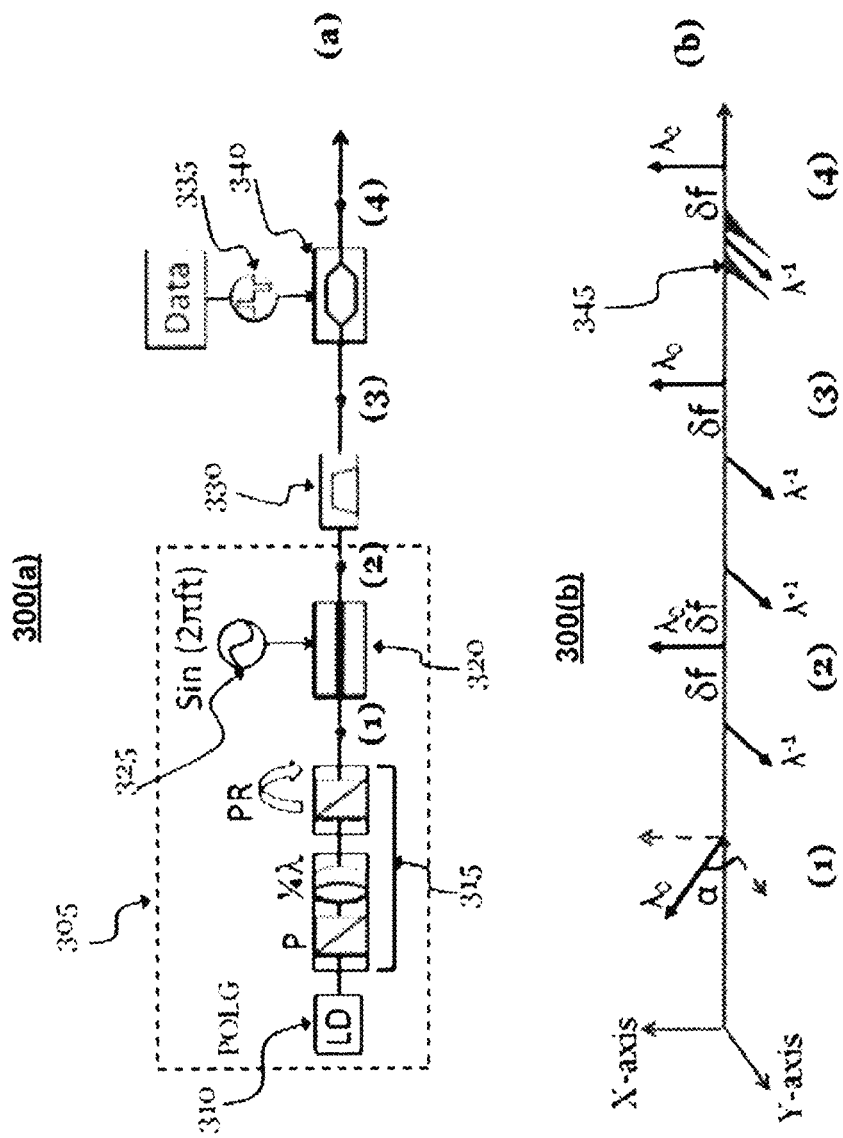
FIG. 3 illustrates a phase-correlated orthogonally-polarized light-stream generator (POLG) apparatus and data coding apparatus, with a corresponding sketch of the state of polarization and frequency spectrum at designated points along the optical path, in accordance with one embodiment of the present disclosure.

FIG. 3 illustrates a system including a POLG 305, in accordance with one embodiment of the present disclosure. The system of FIG. 3 is configured for producing a light stream simultaneously comprising one carrier wavelength $\lambda_0$ having a first linear polarization direction and two principal optical sidebands $\lambda^{+1}$ and $\lambda^{-1}$ having a second linear polarization orthogonal to the first. Wavelength sidebands and polarization result when light of wavelength $\lambda_0$ traverses phase modulator 320, operated at cyclic frequency f. Phase modulator 320 comprises one or more waveguides having zinc blend crystal symmetry and can be configured to modulate only one of two orthogonal states of linear polarization of light while imperceptibly affecting the orthogonal state of polarization. As shown at 300(b) each sideband $\lambda^{+1}$ and $\lambda^{-1}$ is separated from the carrier wave $\lambda_0$ by frequency interval $\delta f = c/(\lambda_0 + \lambda^+) = c/(\lambda_0 - \lambda^-)$. Light flux modulator 340 and phase modulator 320 are illustrated further in FIGS. 4-6.

Figure 7:
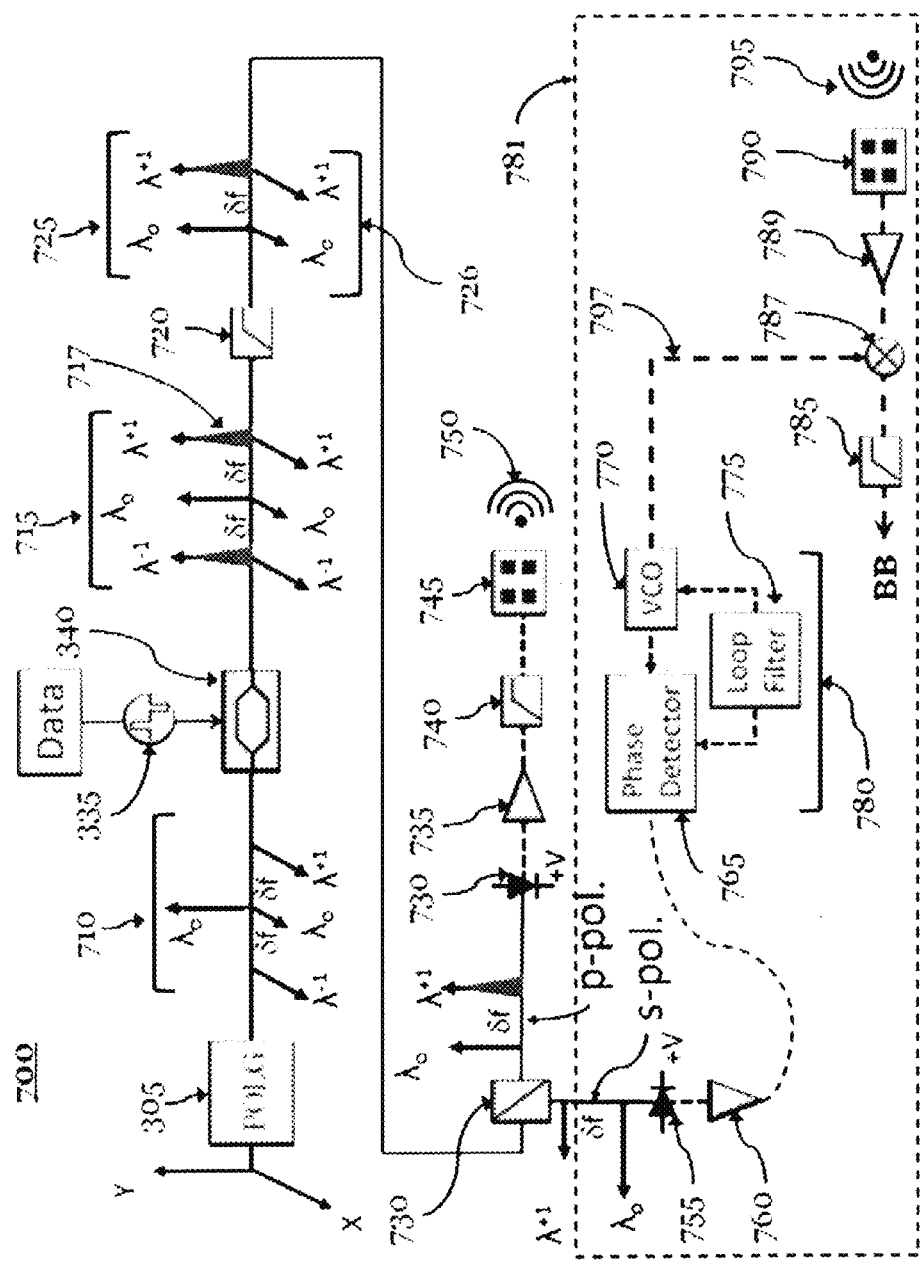
FIG. 7 illustrates an apparatus transmitting optically coded radio frequency data and providing radio frequency local oscillator for analog decoding received radio frequency waves, in accordance with one embodiment of the present disclosure.
Figure 8:
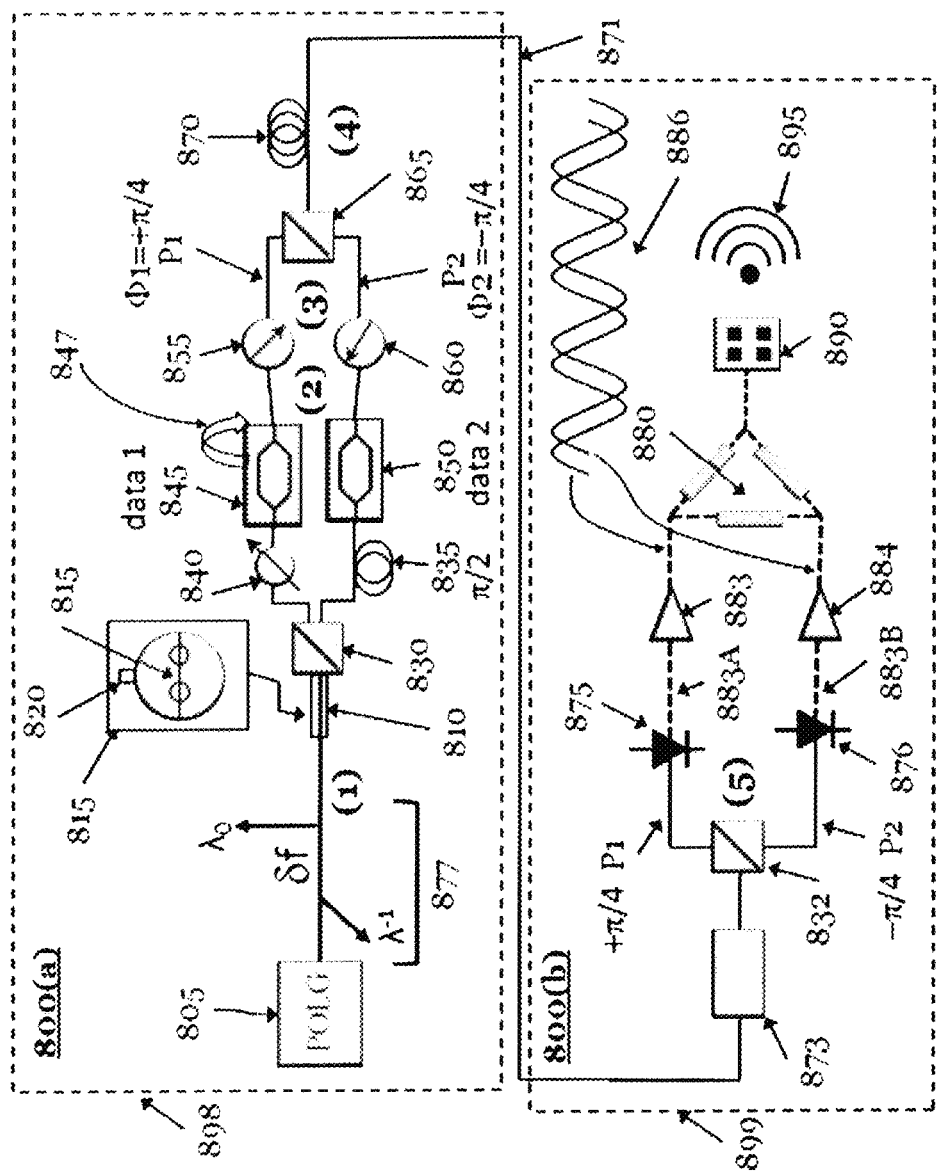
FIG. 8 illustrates an apparatus for preparing in-phase and quadrature coded radio frequency carrier waves in the optical domain and apparatus for launching in-phase and quadrature coded radio frequency carrier wave into free space, in accordance one embodiment of the present disclosure.
Figure 9:
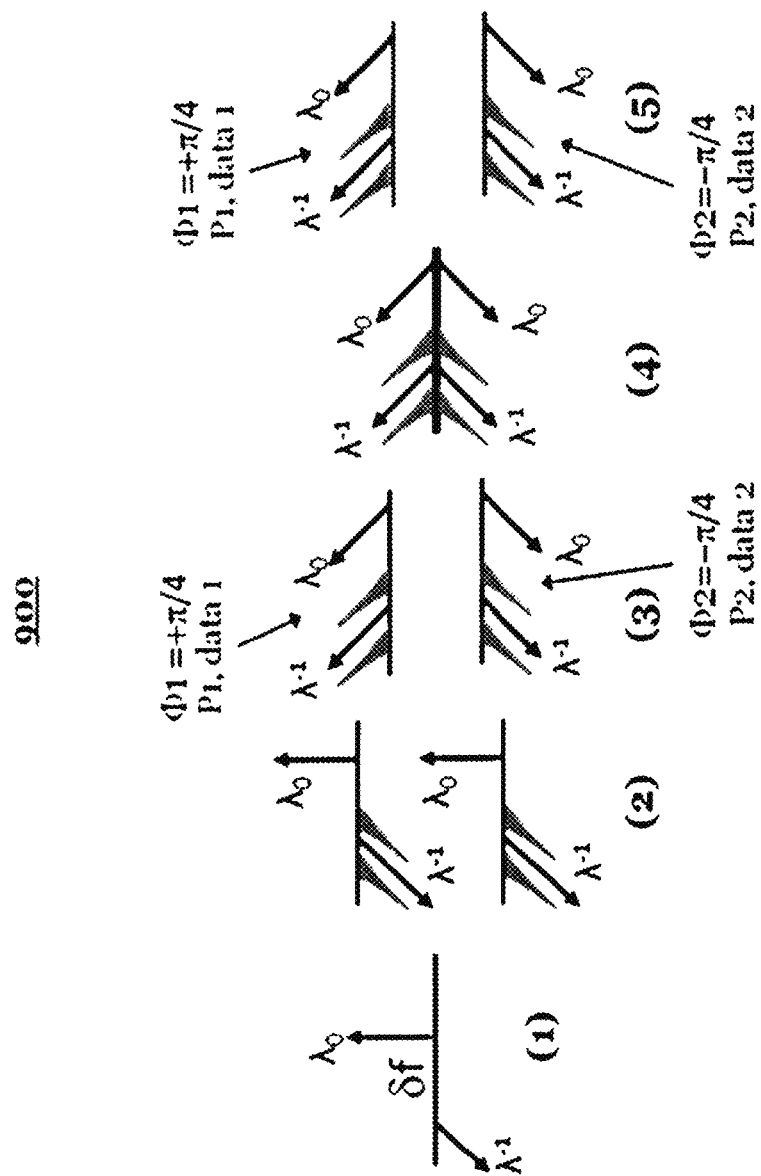
FIG. 9 shows spectral content, state of polarization, and radio frequency phase at various stages during the light stream preparation process in the optical domain, in accordance with some embodiments of the present disclosure.

The POLG 305 can prepare light from a single source into phase-coherent light streams having defined states of polarization and spectral composition. Thus, in some embodiments, the POLG 305 may comprise "light pre-processing." Light of a chosen wavelength exiting POLG light pre-processing may be encoded with data and transmitted and eventually decoded at a receiver by coherent detection using a reference light emanating from the POLG, for example, $\lambda_0$. Exemplary embodiments are illustrated in FIGS. 7-9. Light pre-processing is advantageous because it can assure a high degree of coherence, low degree of phase noise, and auto-compensation for the channel impediment, commonly referred to as polarization mode dispersion and polarization ellipticity. When used in conjunction with a data coding device, for example an electro-optic light flux modulator 340 (see 300(a) of FIG. 3), leaking of information encoded in a channel into an orthogonal channel can be prevented. For example, in some embodiments, the electro-optic light flux modulator 340 can allow passage of two orthogonal, linear polarized lights having different wavelengths, and encode data on light of only one linear polarization, while leaving undisturbed the co-propagating, perpendicularly polarized light.

Referring again to 300(a) of FIG. 3, the POLG apparatus 305 may comprise a distributed feedback laser diode 310, a polarization apparatus 315 to prepare the initial state of polarization of light, and a sinusoidal electrical oscillator 325 that applies a periodic electrical field to the electro-optical phase modulator 320. The polarization apparatus 315 may comprise fixed linear polarizer (P), a ($\frac{1}{4}\lambda$) retardation plate, and a rotating linear polarizer (PR).

Referring now to 300(b) of FIG. 3, positions (1), (2), (3) and (4) refer to corresponding numbered positions in drawing 300(a). As illustrated at 300(b), the state of linear polarization and spectral components of the light stream are sketched at positions along the path at 300(a). Light with wavelength $\lambda_0$ emitted from laser diode 310 can traverse polarization apparatus 315 and emerge in a desired state of linear polarization with electric field vector making angle $\alpha$ with respect to the principal axis of symmetry of the phase modulator crystal 320, in this case, the y-axis. For example, in an embodiment, the phase modulator crystal 320 can be $LiNbO_3$ and thereby become naturally birefringent. Thus, its modulation efficiency can vary with polarization of the incident light stream, and it is impossible to modulate light of one polarization and not leak the modulation into the orthogonally polarized light. Similarly, in an embodiment, the phase modulator crystal 320 can be an intrinsically isotropic electro-optic crystal of zinc blende symmetry which can be intentionally configured and operated in a birefringent mode.

If the phase modulator crystal 320 is not operating in a birefingent mode, then the modulation of light polarized in the x-direction, for example, does not occur and only light that is polarized in the y-direction is modulated, resulting in first order optical sidebands at wavelengths $\lambda^{-1}$ and $\lambda^{+1}$. Electro-optic crystals with space group symmetry $F\bar{4}3m$, for example InP and GaAs, can be suitable crystalline materials that can be configured as modulators exhibiting high polarization selectivity based on the symmetry of their electro-optic tensor.

With input light $\lambda_0$, the output of the POLG apparatus 305 at 300(a) can comprise light at wavelength $\lambda_0$, polarized linearly in the x-direction, and optical sideband lights at wavelengths $\lambda^{+1}$ and $\lambda^{-1}$, polarized linearly in the y-direction. These lights can be used in a coherent communication system. The orthogonally polarized optical carrier with wavelength $\lambda_0$ and the optical side bands with wavelengths $\lambda^{+1}$ and $\lambda^{-1}$ can have coherent phases since they originate from the same source and traverse the same optical path. Furthermore, channel birefringence and substantially stochastic polarization fluctuations in the channel can affect all these lights in a substantially similar manner during channel propagation, resulting in coherent, substantially orthogonally polarized lights at the receiver.

As depicted at 300(a) and 300(b) of FIG. 3, an optical bandpass filter 330 may be used to reject one optical sideband. The remaining optical carrier $\lambda_0$ and one optical sideband $\lambda^{-1}$ at position (3), for example, may traverse a polarization-selective electro-optic light flux modulator 340 configured from a suitable crystal of space group symmetry F$\bar{4}$3m and driven by data encoder 335. Polarization-selective light flux modulator 340, can modulate light of one polarization, for example, $\lambda^{-1}$ with data sidebands 345 shown in 300(b) at position (4), while not affecting orthogonally polarized light $\lambda_0$ at position (4). Then the optical carrier light $\lambda_0$ remains as the coherent, phase-correlated reference light which may be used for coherent detection at the receiver, or for the optical heterodyne generation of coded millimeter-waves for free-space communication, or for upstream baseband communication. The degree to which the light flux modulator 340 is polarization-selective can depend on the natural properties of the electro-optic crystal, the construction of the modulator and the propagation direction and linear polarization direction of the lights with respect to the crystal's axis of symmetry. Intrinsically birefringent crystals such as Lithium Niobate (LiNbO$_3$), Lithium Tantalate (LiTaO$_3$), and Potassium Titanyl Phosphate (KTiOPO$_4$) are not highly polarization selective and can result in partial modulation of the orthogonally polarized channel. InP and GaAs are not intrinsically birefringent and can result in no leakage of modulation into the orthogonally polarized channel.

Figure 4:
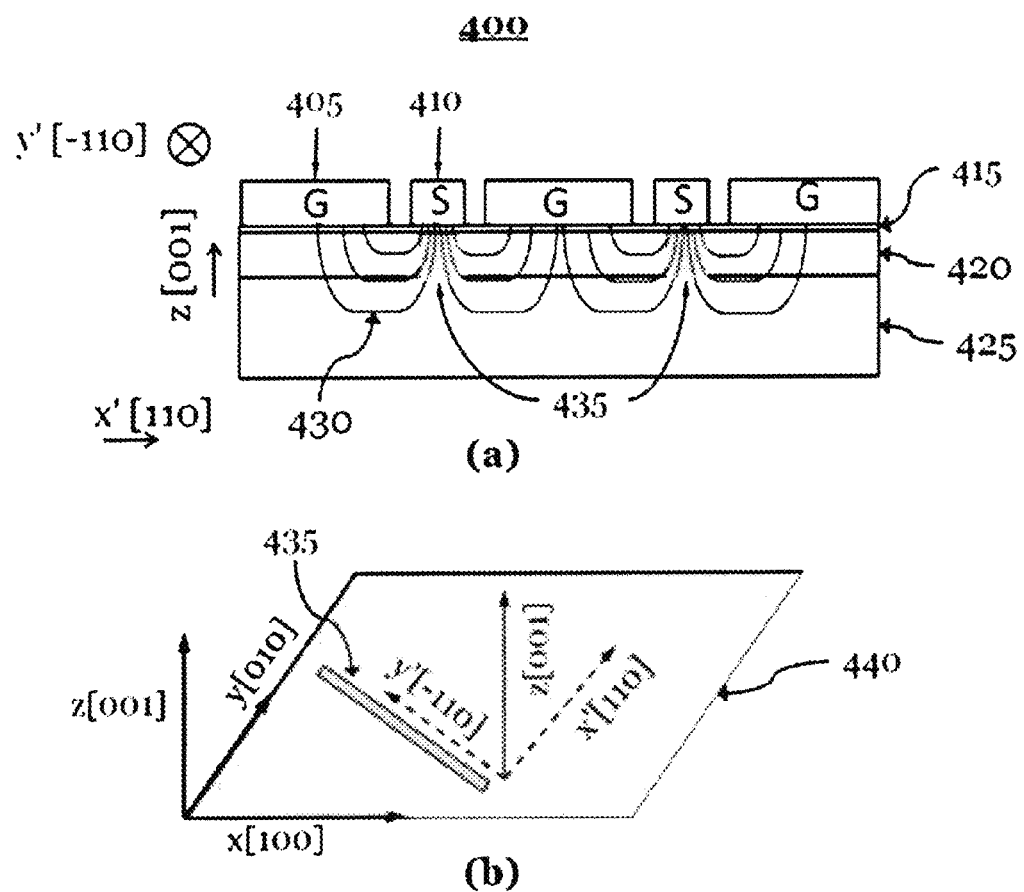
FIG. 4 is a cross sectional view of an electro-optic modulator comprising crystal exhibiting $F\bar{4}3m$ space group symmetry, showing external applied electric field direction, electrical contact placement, and optical waveguide orientation designated by Miller indices for the space group $F\bar{4}3m$.

Aspects of polarization selective modulators in accordance with various embodiments of the present disclosure will now be described in further detail. Zinc Blende, III-V semiconductors, space group symmetry F$\bar{4}$3m, are not intrinsically birefringent. However, if subjected to an external electric field F$_z$, the index ellipsoid or indicatrix for a III-V semiconductor can take the form $$(x^2+y^2+z^2)/n_o^2+2r_{41}(yzF_x+zxF_y+xyF_z)=1 \quad \text{Eq. 6}$$

where n$_o$ is the ordinary refractive index, which is about 3.2 for InP, and r$_{41}$ are the three non-zero, identical, off-diagonal elements of the electro-optic tensor. Since crystal growth in these materials usually proceeds perpendicular to the (001) surface and along the [001] z-axis, in an exemplary embodiment, an electric field can be applied along the z-axis as represented in FIG. 4 (a) and (b). In this case, $F_x=F_y=0$; $F_z\neq0$ and Eq. 6 can become $$(x^2+y^2+z^2)/n_o^2+2r_{41}xyF_z=1 \quad \text{Eq. 7}$$

Due to the off-diagonal components of the electro-optic tensor, the principal axes in the xy plane are rotated by 45° in the presence of an applied electric field F$_z$, forming the rotated coordinate system about the [001] (z-axis) with [110] (x'-axis) and [$\bar{1}$10] (y'-axis) in the (001) plane. Therefore, the index ellipsoid or the indicatrix in the new coordinate system can be represented by Eq. 8, sketched in FIG. 4 at 400(a).

$$x'^2[1/n_o^2+r_{41}F_z]+y'^2[1/n_o^2-r_{41}F_z]+z^2/n_o^2=1 \quad \text{Eq. 8}$$

Eq. 8 shows that for a waveguide along [110] (x'-axis) or [$\bar{1}$10] (y'-axis) direction, the index modulation can be given by $$n'_{y'}=[1/n_o^2-r_{41}F_z]^{-1/2}\approx n_o+\tfrac{1}{2}n_o^3 r_{41}F_z \quad \text{Eq. 9}$$

$$n'_{x'}=[1/n_o^2+r_{41}F_z]^{-1/2}\approx n_o-\tfrac{1}{2}n_o^3 r_{41}F_z \quad \text{Eq. 10}$$

for the waveguide TE mode, which is polarized with electric field in the crystal's z[001] direction, as depicted in FIG. 4 at 400(a). One important consequence of Eq. 9 and Eq. 10 is that changes in the refractive index only occur in the plane of the waveguide, the xy-plane, when an external field F$_z$ is applied in the orthogonal [001] z-direction. Therefore, for the waveguide orientation shown in FIG. 4, the waveguide TM mode, which is polarized with electric field parallel to the waveguide propagation direction y' [$\bar{1}$10] is not modulated because all the electro-optic tensor elements, aside from r$_{41}$, are null. Therefore, all III-V electro-optic modulators (e.g., InP/InGaAsP or GaAs/GaAlAs) subject to the waveguide orientation depicted in FIG. 4 can have high polarization selectivity under modulation in the z[001] direction. Also note that the sign of the index change depends on the waveguide orientation.

$$\Delta n=n_{y'}-n_{x'}=\pm\tfrac{1}{2}n_o^3 r_{41}F_z \quad \text{Eq. 11}$$

An InP Mach-Zehnder modulator with waveguides also oriented parallel to the [$\bar{1}$10] direction, but lying in the [$\bar{1}$10]-[001] or (y-z) plane, not the (x-y) plane as depicted in FIG. 4, has been described by Ogiso et al. ([Ogiso 2014]). The symmetry inherent in Eq. 9 and Eq. 10, i.e., equal and opposite magnitude changes in the index of refraction along directions [$\bar{1}$10] and [110] as described by Eq. 9 and Eq. 10 and depicted in FIG. 4, is therefore broken, enabling modulation of the TM mode in the case described by Ogiso et al. ([Ogiso 2014]).

In FIG. 4, 400(a) depicts a cross section view of a zinc blende crystal modulator constructed on a (001) surface of a semi-insulating InP substrate 425, and comprising the substrate 425, an n-doped InP epitaxial layer 420, and a buffer layer 415 separating the semiconductor from ground electrical contacts (G) 405 and driving electrical contacts (S) 410, in accordance with an embodiment of the present disclosure. Electric field lines produced by the electrical contacts are depicted as features 430 and are substantially oriented normal to the surface in the [001] direction directly below the driving electrical contacts (S) where a light guiding optical waveguide is formed by an InGaAsP region 435. The optical waveguides 435 run parallel to a y' [$\bar{1}$10] crystal direction. Polarization of the light stream is indicated by TM when the magnetic field of the waveguide mode is oriented perpendicular to the direction of the applied electric field, F$_z$. TE polarization can indicate that the waveguide mode has electric field aligned perpendicular to the direction of the applied electric field, F$_z$.

Figure 5:
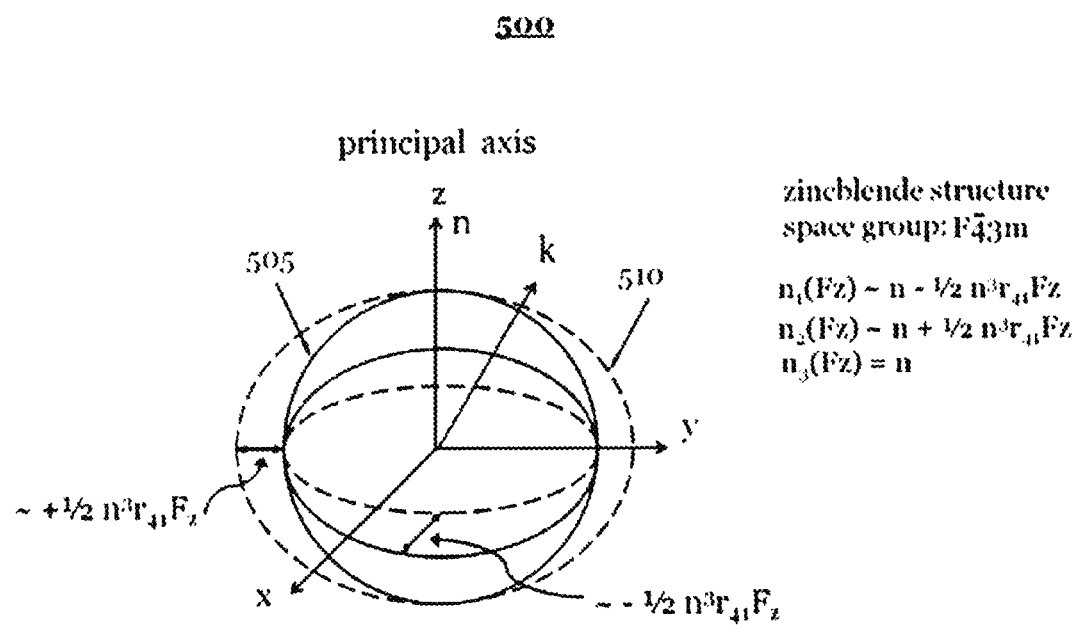
FIG. 5 illustrates a prior art index ellipsoid for an electro-optically active crystal having zincblende symmetry, depicting external electric field effect on the index of refraction.

An intuitive view of the effect of an applied external field F$_z$ on the index of refraction of an electro-optic crystal having space group symmetry F$\bar{4}$3m can be visualized by means of the index ellipsoid of rotation construct about the direction of the applied electric field, F$_z$, usually referred as the z-axis shown in FIG. 5, where the intrinsically isotropic index of refraction is represented by a sphere outlined by the solid-line 505 and the index of refraction ellipsoid of rotation under the action of applied field, $F_z$, is represented by broken line 510. The direction of propagation of a electromagnetic plane is represented by phase constant ($\vec{k}$) and the isotropic refractive index when $F_z=0$ is shown as n.

Figure 6:
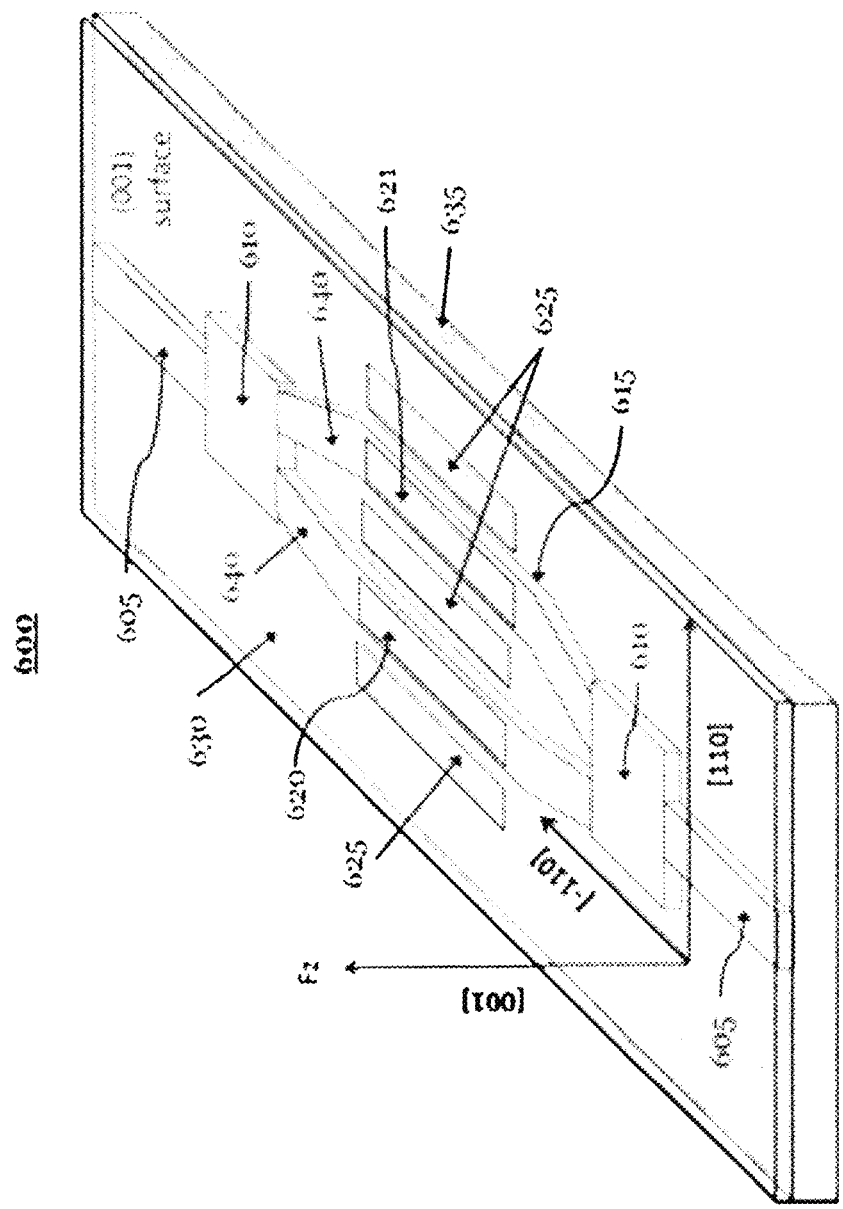
FIG. 6 illustrates zinc blende crystal waveguides on the (001) surface and oriented parallel to the $[\bar{1}10]$ direction and configured to function as a light flux modulator for TM polarized light while affecting no modulation on TE polarized light, in accordance with one embodiment of the present disclosure.

A polarization-selective modulator in accordance with embodiments of the present disclosure can be constructed by aligning optical waveguides and applying an external modulation field in accordance with a crystal's electro-optic tensor symmetry. Thus, in the case of a semiconductor crystal, for example, GaAs or InP or ternary or quarternary compounds thereof, exhibiting space group symmetry F $\overline{4}$3m, a polarization selective modulator may be formed with optical waveguides extended on a (001) surface. In some embodiments the optical waveguides may be either buried waveguides or ridge waveguides, so that light propagates in a [$\overline{1}$10] or [110] direction while external electric fields are applied parallel to the [001] direction. FIG. 6 depicts a semiconductor (001) surface on substrate 635 overlaid with buffer layer 630. Waveguides 640 can be formed parallel to a [$\overline{1}$10] direction. Reciprocal beam splitters or combiners 610 can separate incoming light from one waveguide 605 into two substantially equal parts, each entering one waveguides 640. A structure 610 can be used as a combiner and combine light from waveguides 640 into a single outgoing waveguide 605. In some embodiments, structures 610 may be formed by means of multimode interference in a resonance box.

The index of refraction of each waveguide forming the modulator, for example a light flux modulator, may be varied by the application of an electric field $F_z$ as shown in FIG. 4 and FIG. 5. In some embodiments, this may be accomplished by the application of an electric field on either electrode 620 or electrode 621 or both at the same time but in opposing directions while electrodes 625 provide the electrical return path. The waveguides are oriented parallel to [$\overline{1}$10] or [110] on a (001) semiconductor crystal surface. The waveguide orientation in relation to crystal axes can help prevent modulation of TM polarized light while availing maximum modulation for TE polarized light.

FIG. 7 illustrates an apparatus transmitting optically coded radio frequency data and providing radio frequency local oscillator for analog decoding received radio frequency waves, in accordance with some embodiments of the present disclosure. The polarization and spectral content of a light stream 700 are illustrated with reference to the coordinate axes y and x as a function of perpendicular distance from the y-x plane. The POLG sub-assembly 305 (FIG. 3) can prepare an initial state of the light stream, characterized by carrier wavelength $\lambda_o$, spectral sidebands $\lambda^{+1}$, $\lambda^{-1}$, and orthogonal polarizations indicated by arrows corresponding to the polarization of the light stream, collectively represented by group 710, as also represented at position (2) in 300(b) of FIG. 3. The frequency difference between the central carrier $\lambda_0$ and each of the two sidebands is $\delta f=c/(\lambda_0+\lambda^{+1})=c/(\lambda_0-\lambda^{-1})$ as is also the case as illustrated at FIG. 3.

Group 715 is a rendition of the spectral composition and state of polarization of the light stream after application of phase modulator 320 and light flux modulator 340. POLG phase modulator 320 and light flux modulator 340 can be configured to be highly selective to polarization in accordance with crystal symmetry and waveguide orientation as represented in FIG. 4, FIG. 5, and FIG. 6. Optical filter 720 can remove wavelength bands around $\lambda^{-1}$. Carrier wavelength $\lambda_o$ and data sub-band $\lambda^{+1}$ in group 725 can be passed to polarizing beamsplitter 730, which separates the light polarized along y, shown as group 725, from light polarized along x, shown as group 726. Data bearing, p-polarized light, 725 can impinge on a photodiode 730 where the electric fields pertaining to $\lambda_o$ and $\lambda^{+1}$ can mix to give rise to an electrical signal oscillating at radio frequency $\delta f$ which can be amplified by amplifier 735 and filtered by electrical filter 740. Thereafter, the electrical signal can be radiated in space as radio frequency waves 750 by antenna radiator 745. Un-modulated, s-polarized, light group 726 can impinge on photodiode 755 and produces an electrical signal that can also oscillate at frequency $\delta f$ and can be used as the electrical local oscillator in a radio frequency front-end receiver, group 781. The electrical signal from photodiode 755 can be amplified by the radio frequency amplifier 760 and can enter a phase-tracking loop sub-assembly 780. Moreover, the electrical signal from photodiode 755 can comprise a phase detector 765, a voltage controlled oscillator 770, and a loop filter 775. The front-end receiver can comprise an antenna 790 configured to efficiently couple to electromagnetic waves in a radio frequency band containing $\delta f$ and its data sidebands. The radio frequency signal received from antenna 790 can be amplified by amplifier 789 and frequency mixed with local oscillator signal 797 from photodiode 755 by radio frequency mixer 787. The mixed output from 787 can be filtered by radio frequency filter 785 to retrieve base band data, BB.

FIGS. 8 and 9 illustrate providing phase and quadrature modulation means coding optical and radio frequency transmissions, in accordance with embodiments of the present disclosure. The POLG sub-assembly 305 can prepare the initial state of the light stream, characterized by carrier wavelength $\lambda_o$, spectral sideband $\lambda^{-1}$ and arrows indicating the orthogonal electric field direction or polarization of the light stream 877 at position (1) in 800(a), corresponding to position (3) in 300(b) of FIG. 3. Sideband $\lambda^{+1}$ does not appear in 800(a) as may be blocked by optical filtering means 330 shown in drawing 300(a). The frequency difference between the central carrier and the $\lambda^{+1}$ sideband is substantially the modulation frequency $\delta f=c/(\lambda_0-\lambda^{-1})$ as is the case in conjunction with FIG. 3. Polarization maintaining optical fiber 810 provides means to preserve the state of polarization and is characterized by slow axis direction 815 and alignment key 820 shown in cross section representation 815. Polarization splitter 830 can separate the light stream into two orthogonal components whose flux can be equalized by a variable optical attenuator 840. An optical delay 835, commensurate with ¼$\delta f$, can be introduced in one of the optical streams to adjust the phase between the signal $\lambda^{-1}$ and the reference light $\lambda_0$ to affect optical phase and quadrature coding. ([Zheng December 2014]).

Quadrature data can be encoded on each of the two orthogonally polarized light streams by light flux modulators 845 and 850. As shown in FIG. 8, modulator 850 is rotated 90° relative to modulator 845 about the axis of light input, as indicated by rotation arrow 847, to align the modulation axis of data encoders with the polarization of the light stream. Additionally, as shown at FIG. 5, one light stream is rotated 45° clockwise while the other light stream is rotated −45° counter-clockwise, by polarization rotators 855 and 860 which may be ½$\lambda^{-1}$ plates. The state of polarization of each light stream is designated by P1 or P2 and the relative phases, designated by $\Phi1=+\pi/4$ and $\Phi2=-\pi/4$, are controlled by optical delay 835. $\Phi=(\Phi1-\Phi2)$ is the phase difference between the two radio wave of frequency $\delta f=c/(\lambda_0+\lambda^{-1})$ in light streams P1 and P2. At this point these radio waves exist only as different optical frequencies in the optical domain; after photo-diodes 875 and 876 they will exist in the electrical radio frequency domain and one will be retarded by 90° relative to the other, or will be in quadrature.

The state of polarization and data sidebands for light in each orthogonally polarized stream 900 is depicted in FIG. 9 at numbered positions corresponding to numbered positions along the light path at 800(*a*) of FIG. 8: after emerging from the POLG 805, position (1); after data coding, position (2); after polarization rotators 855 and 860, position (3); after combining the two orthogonally polarize light streams by combiner 865, position (4); and after the two orthogonally polarized light streams are recovered at the destination and re-separated as orthogonally polarized lights, position (5).

The polarization combiner 865 can aggregate the two spatially separated, orthogonally polarized, data bearing light streams into one spatially coincident light stream whose state of polarization and spectral content at position (4) is depicted in drawing 900 of FIG. 9. The two aggregated light streams can carry encoded radio frequencies from the optical light stream encoder sub-assembly 898 to the analog in-phase and quadrature radio frequency transmitter 899 in the optical domain over long distances, signified by optical fiber loops 870.

In some embodiments, each of the two orthogonally polarized light streams carries data and radio frequency carrier δf. The relative phases of the two radio frequency carrier waves in the two light streams is controlled by optical delay 835 and if the phase difference is $\pi/2$, then when the two beams are translated to the electrical domain and combined, as with a Wilkinson power combiner, the system constitutes an in-phase and quadrature radio transmitter without using mixers, frequency synthesizers or additional oscillators. Furthermore, because each constituent wavelength of each orthogonally polarized light stream originates from the same source and substantially follows the same channel path, they are highly phase coherent, resulting in minimum phase noise in the radio frequency carrier wave generated therefrom.

As shown at 800(*b*) of FIG. 8, the state of polarization of the aggregate light stream can develop a certain amount of ellipticity due to incidental optical fiber birefringence. This may be corrected by polarization equalizer 873 before being reconstituted into its two orthogonally polarized light stream components P1 with relative phase $\Phi 1=+\pi/4$ and P2 with relative phase $\Phi 2=-\pi/4$, by polarizing beam splitter 832. Each beam P1 and P2 can then be incident respective photodiodes 875 and 876. Heterodyne mixing of parallel-polarized electric fields can occur on each photodiode and can generate electrical radio frequency signals that are amplified by amplifiers 883 and 884 and can be carried, for example, to a Wilkinson power combiner 880, and to an antenna radiator 890 over transmission lines represented by broken lines 881 and 882. The radiated signal can include two radio frequency carrier waves that are in relative phase delay of 90° and each can carry quadrature encoded analog data. The relative phase delay of the two carrier waves is depicted by drawing sinusoidal forms 886 displaying relative ¼ λ phase offset.

In another embodiment, the POLG apparatus, used in conjunction with polarization selective modulators, can be used to transmit in-phase and quadrature coded optical data accompanied by a phase coherent light stream to be used as the optical local oscillator at the coherent optical receiver. Referring to 800(*a*) of FIG. 8, light from the optical light stream encoder sub-assembly 898 at position (4) is transmitted. The polarization components and spectral content of the transmitted light stream at position (4) is depicted at 900 at position (4) and at position (4) in drawing 1000 of FIG. 10, which depicts a simplified optical coherent detection sub-assembly without a separate optical local oscillator.

Data 1010 (FIG. 10) entering the coherent detection sub-assembly can comprise P1-polarized light bearing Ix-data and orthogonally polarized P2 light bearing Qx-data. Polarizing beamsplitter 1005 can separate the two polarizations into a Qx path separate from the Ix path represented by directions 5(*a*) and 5(*b*). Beamsplitter 1005 can perform a substantially similar function as beamsplitter 832 in quadrature radio frequency transmitter 899 at 800(*b*) of FIG. 8. Light stream 5(*a*) bearing Ix data can be split into two substantially equal channels by multimode interference beamsplitter 1025 and each channel can be incident on one of a matched photo-diode doublet 130. Light stream 5(*b*) bearing Qx data can be split into two substantially equal channels by multimode interference beamsplitter 1030 and each channel can be incident on one of a photo-diode matched pair 130. Electrical amplifiers 135 can boost the signal before entering the digital signal processing sub-assembly 1100.

Figure 10:
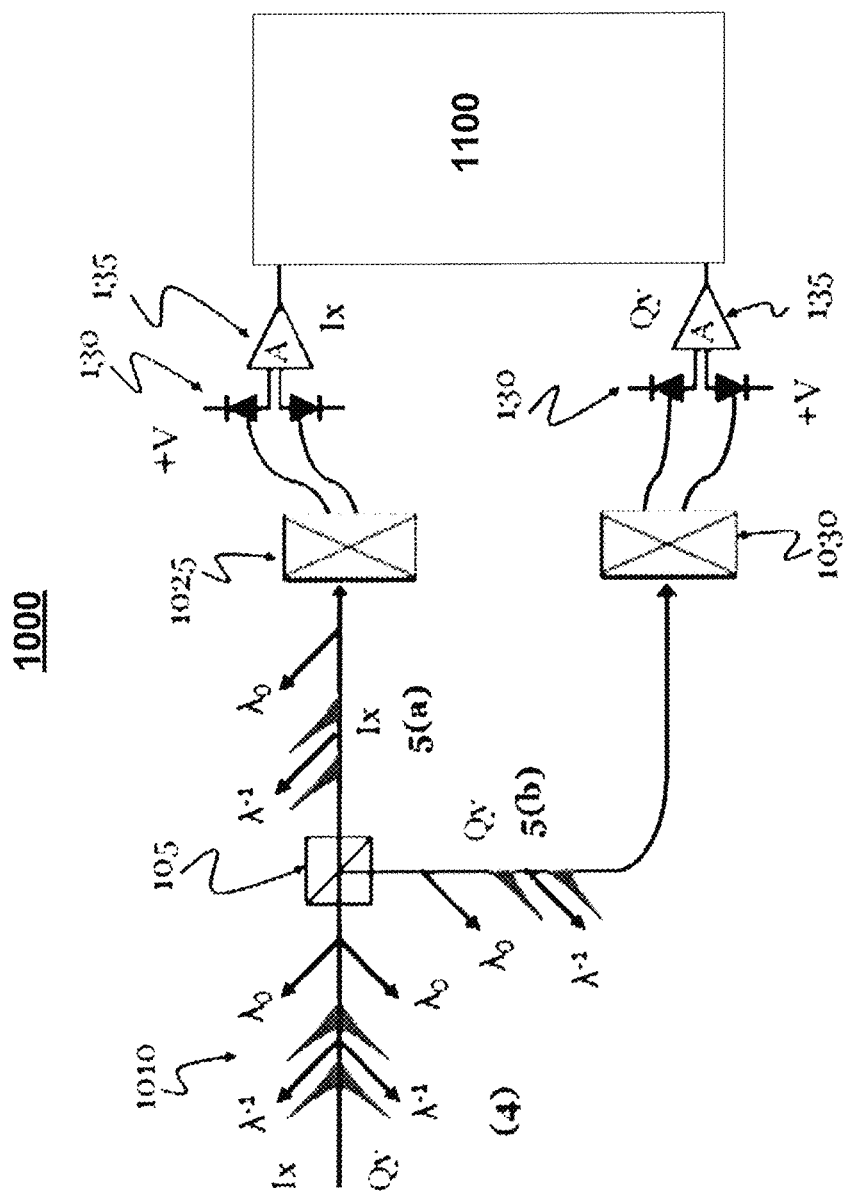
FIG. 10 illustrates a system with an optical coherent detection sub-assembly without a separate optical local oscillator, in accordance with one embodiment of the present disclosure.

In FIG. 10, there is no local optical local oscillator. The accompanying central carrier wavelength $\lambda_o$ is used instead. The central carrier can be spectrally shifted from the data band and can be substantially phase coherent with the data light stream since both are derived from the same laser diode 310 in the POLG and follow substantially the same channel path. Simplification at receiver digital signal processing end can be balanced by slightly increased complexity in light stream preparation at the analog front end in conjunction with analog polarization ellipticity correction by polarization equalizer 873 in 800(*b*).

In some embodiments, a POLG apparatus, when used in conjunction with polarization selective modulators, can demonstrate how to use optical methods to transmit analog radio frequency data in a format generally referred to as "frequency hopping spread spectrum" relating to the transmitting and receiving of secure data in wireless radio frequency communications.

Figure 11:
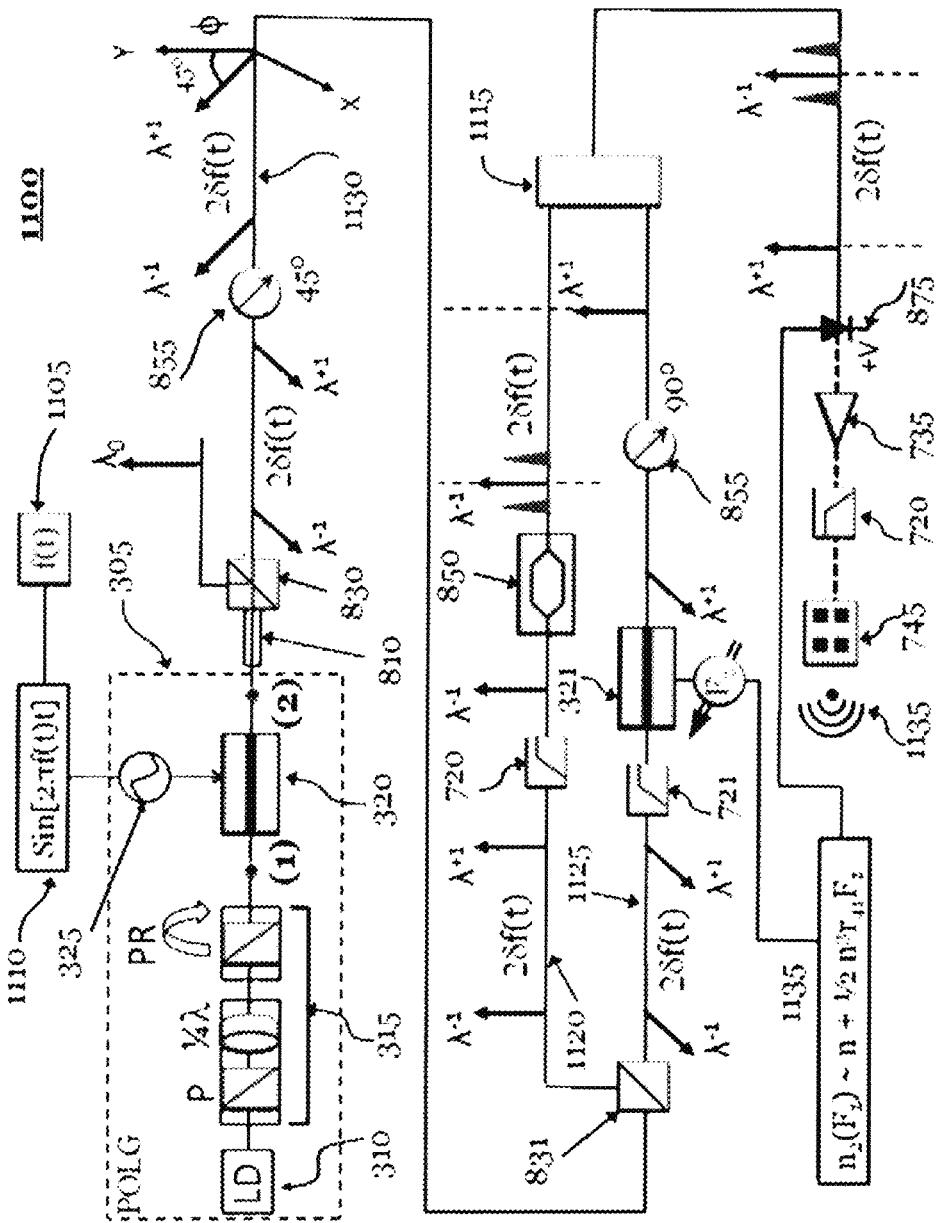
FIG. 11 illustrates a system using a POLG and polarization modulators for transmitting and receiving of secure data in wireless radio frequency communications.

Referring to the embodiment shown in FIG. 11, the phase modulator 320 can be driven at sinusoidal frequencies that vary cyclically between an upper and a lower limit in a predetermined, truncated sequence, for example, a Fibonacci sequence. Sinusoidal waveforms can be generated by frequency synthesizer 1110 as determined by the programmed protocol of the logical frequency sequencing unit 1105. A first consequence of driving the phase modulator 320 in a frequency hopping mode is the spectral hopping of the modulation sidebands $\lambda^{+1}$ and $\lambda^{-1}$ which are spectrally separated by optical frequency difference $2\delta f(t)$. The transmutation of frequency $2\delta f(t)$ from the optical to the electrical domain occurs when the two light streams, having wavelengths $\lambda^{+1}$ and $\lambda^{-1}$, are heterodyne mixed on a photo-diode. Each temporary radio frequency band is used for transmission and reception during a finite dwell time, as determined by the logical frequency sequencing unit 1105. During the frequency dwell time each of the hopping radio frequencies, $2\delta f(t)$, may carry portions of a message. The complete message may be obtained if the frequency sequencing protocol is previously shared between sender and receiver.

The communication sequence in the embodiment depicted in FIG. 11 may be summarized as follows. The state of polarization and principal spectral sidebands of the light stream are prepared by the POLG sub-assembly 305 as discussed in conjunction with FIG. 3. Light emanating from the POLG comprises a central carrier wavelength $\lambda^o$ and orthogonally polarized, phase modulation sidebands $\lambda^{+1}$ and $\lambda^{-1}$, as depicted at position (2) at 300(*b*) of FIG. 3. Polarization maintaining fiber 810 guides light to polarization beamsplitter 830 where the central wavelength $\lambda^\circ$ is diverted to other uses not relevant to this specific exemplary embodiment. The linear polarization of sidebands $\lambda^{+1}$ and $\lambda^{-1}$ transmitted by polarizing beamsplitter 830 are rotated 45° by polarization rotator 855 and the orthogonally polarized components of the light stream are separated by polarization beamsplitter 831 into two light streams 1120 and 1125. Light in stream 1120 is orthogonally polarized to light in stream 1125. Optical filter 720 removes sideband X' from light stream 1120 while optical filter 721 removes sideband $\lambda^{-1}$ from light stream 1125. Remaining sideband $\lambda^{-1}$ in light stream 1120 is then encoded with data by modulator 850 while remaining sideband $\lambda^{+1}$ in light stream 1125 is not modulated but its linear polarization is rotated by 90° to become parallel to the linear polarization in light stream 1120.

Parallel polarized light streams 1120 and 1125 are then merged into one light stream by light combiner 1115. Because two different light paths are produced at polarizing beamsplitter 831, the phase coherence condition between the two sidebands in the original light stream 1130 is violated. The function of phase retardation device 321 is to compensate for substantially slow drifts in the phase coherence between the two sidebands, within an integral multiple of $2\pi$, by acting on the slow average drift signal detected by photo-diode 875.

After the two parallel polarized light streams are combined by combiner 1115, the resulting light stream contains the un-modulated sideband $\lambda^{+1}$ which is polarized parallel to the co-propagating, data bearing sideband $\lambda^{-1}$. Upon heterodyne mixing on photo-diode 875, electrical amplification 735 and electrical filter 720, the resulting frequency hopping radio frequency signal is transmitted by antenna radiator 745 as represented by structure 1140. Coherence of the two optical sidebands $\lambda^{+1}$ and $\lambda^{-1}$ that generate a steady, non-fading radio frequency carrier wave, having frequency $2\delta f(t)$, is maintained by detecting substantially slow average photo-current drift by photo-diode 875. A slow current drift indicates a walk-off the coherence state. The coherent state can be closely maintained by adjusting a variable applied voltage, $F_z$, on phase retardation device 321 in accordance with variations of the monitoring current from photo-diode 875 through feed-back loop 1135. One example of a phase retardation device, 321, may be an optical waveguide composed of a zinc blende crystal, said waveguide oriented on a (001) zinc blende crystal surface such that light in the waveguide propagates substantially parallel to a [110] direction and the magnitude of phase retardation is proportional to the applied external field $F_z$ in accordance with Eq. 1 or 2, for example, $n_2(F_z) \sim n_o + \frac{1}{2} n^3 r_{41} F_z$.

The specific configurations, choice of materials and the size and shape of various elements can be varied according to particular design specifications or constraints requiring a system or method constructed according to the principles of the present disclosure. Such changes are intended to be embraced within the scope of the present disclosure. The presently disclosed embodiments, therefore, are considered in all respects to be illustrative and not restrictive. The scope of the present disclosure is indicated by the appended claims, rather than the foregoing description, and all changes that come within the meaning and range of equivalents thereof are intended to be embraced therein.

REFERENCES

[Roberts 2009]: K. Roberts, et al., "Performance of Dual-Polarization QPSK for Optical Transport Systems," *J. Lightwave Technol.* 27(1), 3546-3559 (2009).

[Li 2009]: G. Li, "Recent Advances in Coherent Optical Communication," *Adv. Opt. Photon.*, 1(2), 279-307 (2009).

[Nakazawa 2010]: M. Nakazawa, et al., *High Spectral Density Optical Communications Technologies*, Springer 2010.

[Ip 2008]: E. Ip, et al., "Coherent detection in optical fiber systems," *Opt. Express*, 16(2), 753-791 (2008).

[Savory 2010]: S. J. Savory, "Digital coherent optical receivers: algorithms and subsystems," *IEEE J. Sel. Topics Quantum Electron.*, 16(5), 1164-1178 (2010).

[Kuschnerov 2009]: M. Kuschnerov, et al., "DSP for Coherent Single-Carrier Receivers," *J. Lightwave Technol.*, 27(16), 3614-3422 (2009).

[Dong 2011]: Z. Dong, et al., "Ultra-dense WDM-PON Delivering Carrier Centralized Nyquist-WDM Uplink with Digital Coherent Detection," *Opt. Express*, 19(12), 11100-11105 (2011).

[Zhu 2012]: M. Zhu, et al., "Efficient delivery of integrated wired and wireless services in UDWDM-RoF-PON coherent access network," *IEEE Photon. Technol. Lett.*, 24(13), 1127-1129 (2012).

[Presi 2014]: M. Presi et al., "All DFB-based coherent UDWDM PON with 6.25 GHz spacing and a >40 dB power budget," *IEEE Photon. Technol. Lett.*, 26(2), 106-110 (2014).

[Prat 2012]: J. Prat et al., "Simple intradyne PSK system for ud WDM-PON," *Opt. Express*, 20(27), 28758-28763 (2012).

[Shahpari 2014]: A. Shahpari, et al., "Fully coherent self-homodyne bi-directional enhanced performance PON," Optical Fiber Communication Conference, San Francisco, 2014, W4G.1.

[Sagues 2010]: M. Sagues, et al., "Orthogonally polarized optical single sideband modulation for microwave photonics processing using stimulated Brillouin scattering," *Opt. Express*, 18, 22906 (2010).

[Campillo 2007]: A. Campillo, "Orthogonally polarized single sideband modulator," *Optics Letters*, 32, 3152 (2007).

[Zheng November 2014]: J. Zheng, et al., "Orthogonal Single-Sideband Signal Generation Using Improved Sagnac-Loop-Based Modulator," *IEEE Photon. Technol. Lett*, 26, 2229 (November 2014).

[Wooten 2000]: E. L. Wooten, et al., *IEEE Journal of Selected Topics in Quantum Electronics*, 6, 69-82 (2000).

[Ogiso 2014]: Y, Ogiso, et al., "Planar n-SI-n heterostructure athermal InP (110) optical modulator," *Opt. Express*, 22, 25776 (2014).

[Zheng December 2014]: J. Zheng, et al., *Opt. Express*, 22(26) (December 2014).

What is claimed is:

1. A communications system, comprising:
a phase-correlated, orthogonally-polarized, light-stream generator (POLG) for preparing light into phase coherent light streams having defined states of polarization and spectral composition, the POLG comprising:
a light source configured to emit light having a predetermined wavelength;
a polarization apparatus configured to prepare light from the light source into particular states of polarization;

a phase modulator configured to produce light having a plurality of wavelengths and configured to retard the phase of propagation of light with a first state of linear polarization while not retarding the phase of light with a state of linear polarization orthogonal to the first state of linear polarization when an external electric field is applied; and
an electrical oscillator configured to periodically apply an electric field to the phase modulator.

2. The communication system of claim 1, wherein the polarization apparatus comprises:
a first, fixed linear polarizer;
a 90 degree optical retarder; and
a rotatable, second linear polarizer.

3. The communication system of claim 1, wherein the phase modulator comprises a semiconductor crystal having a zinc blende symmetry or space group symmetry $F\bar{4}3m$.

4. The communication system of claim 3, wherein the semiconductor crystal belongs to the class of III-V compound semiconductors.

5. The communication system of claim 1, further comprising a polarization-selective light flux modulator coupled to the POLG, the polarization-selective light flux modulator configured to change the flux of light with a first state of linear polarization while not changing the flux of light with a state of linear polarization orthogonal to the first state of linear polarization when an external electric field is applied.

6. The communications system of claim 5, wherein at least one of the phase modulator and polarization-selective light flux modulator comprises a semiconductor crystal including Gallium Arsenide or Indium Phosphide.

7. The communications system of claim 5, further comprising a data encoder configured to drive the polarization-selective light flux modulator and forming, together with the polarization-selective light flux modulator, a light intensity modulator configured to encode data on one polarization of light emerging from the polarization-selective light flux modulator while not encoding data on light having an orthogonal polarization.

8. The communication system of claim 5, wherein the polarization-selective light flux modulator is configured as a Mach-Zehnder interferometer.

9. The communication system of claim 5, wherein the polarization-selective light flux modulator comprises:
a plurality of optical waveguides extending parallel to a crystal surface having a perpendicular axis parallel to the z-axis and configured and oriented such that light propagates in the waveguides parallel to a y'-direction or a x'-direction while an external electric field is applied in a z'-direction;
a plurality of electrical contacts coupled to each of the plurality of optical waveguides; and
an electrical field source configured to provide the external electric field in the z'-direction at each of the plurality of optical waveguides, via the plurality of electrical contacts.

10. The communication system of claim 9, wherein the index of refraction of each of the plurality of optical waveguides is variable by application of the external electric field.

11. A communications system, comprising:
a light source configured to emit light having a predetermined wavelength;
a polarization apparatus configured to prepare light from the light source into particular states of polarization, the polarization apparatus comprising:
a first, fixed linear polarizer,
a 90 degree optical retarder, and
a rotatable, second linear polarizer;
an electro-optical light phase modulator configured to produce light having a plurality of wavelengths and configured to retard the phase of propagation of light with a first state of linear polarization while not retarding the phase of light with a state of linear polarization orthogonal to the first state of linear polarization when an external electric field is applied; and
a sinusoidal electrical oscillator configured to periodically apply an electric field to the light phase modulator.

12. The communication system of claim 11, wherein the light phase modulator is configured to produce a first light characterized by a first wavelength and first state of linear polarization and a second light characterized by a second wavelength and a second state of polarization orthogonal to the first state of polarization.

13. The communication system of claim 11, wherein the light phase modulator comprises an electro-optic crystal belonging to space group symmetry $F\bar{4}3m$ and configured as a Mach-Zehnder interferometer.

14. The communication system of claim 13, wherein the electro-optic crystal belongs to the class of III-V compound semiconductors.

15. The communication system of claim 11, further comprising a light flux modulator configured to change the flux of light with a first state of linear polarization while not changing the flux of light with a state of linear polarization orthogonal to the first state of linear polarization when an external electric field is applied.

16. The communication system of claim 15, wherein the light flux modulator comprises an electro-optic crystal belonging to space group symmetry $F\bar{4}3m$ and configured as a Mach-Zehnder interferometer.

17. The communication system of claim 15, wherein the light flux modulator is configured to encode data on light characterized by a first state of polarization while not encode data on light characterized by a second state of polarization orthogonal to the first state of polarization.

18. The communication system of claim 15, wherein the light flux modulator comprises:
a plurality of optical waveguides extending parallel to a crystal surface having a perpendicular axis parallel to the z-axis and configured and oriented such that light propagates in a waveguide parallel to a y'-direction or a x'-direction while an external electric is applied in a z'-direction;
a plurality of electrical contacts coupled to each of the plurality of optical waveguides; and
an electrical field source configured to provide the external electric field in the z'-direction at each of the plurality of optical waveguides, via the plurality of electrical contacts.

19. The communication system of claim 18, wherein the plurality of optical waveguides comprise buried waveguides or ridge waveguides.

20. The communication system of claim 18, wherein the electric field source is configured to be substantially periodic in time.

21. A communications system, comprising:
a light source configured to emit light having a predetermined wavelength;
a polarization apparatus configured to prepare light from the light source into particular states of polarization, the polarization apparatus comprising:
a first, fixed linear polarizer,
a 90 degree optical retarder, and
a rotatable, second linear polarizer;

a phase modulator configured to produce light having a plurality of wavelengths and configured to retard the phase of propagation of light with a first state of linear polarization while not retarding the phase of light with a state of linear polarization orthogonal to the first state of linear polarization when an external electric field is applied;

an electrical oscillator configured to periodically apply an electric field to the phase modulator; and a light flux modulator configured to change the flux of light with a first state of linear polarization while not changing the flux of light with a state of linear polarization orthogonal to the first state of linear polarization when an external electric field is applied.

22. The communication system of claim 21, wherein the light flux modulator is configured to encode data on light characterized by a first state of polarization while not encode data on light characterized by a second state of polarization orthogonal to the first state of polarization.

23. The communication system of claim 21, wherein the light flux modulator comprises:
- a plurality of optical waveguides extending parallel to a crystal surface perpendicular to the crystal z-direction waveguides configured and oriented such that light propagates in the waveguides in a y'-direction or a x'-direction while an external electric field is applied in a z'-direction;
- a plurality of electrical contacts coupled to each of the plurality of optical waveguides; and
- an electrical field source configured to provide the external electric field in the z'-direction at each of the plurality of optical waveguides, via the plurality of electrical contacts.

* * * * *